(12) United States Patent
Doyon et al.

(10) Patent No.: US 8,222,576 B2
(45) Date of Patent: Jul. 17, 2012

(54) INDUCTION HEAT TREATMENT OF COMPLEX-SHAPED WORKPIECES

(75) Inventors: Gary A. Doyon, Gross Pointe Farms, MI (US); Don L. Loveless, Rochester, MI (US); Douglas R. Brown, Rochester Hills, MI (US); Valery I. Rudnev, Rochester Hills, MI (US); Timothy G. Boussie, Madison Heights, MI (US); Glenville Colin Desmier, Novi, MI (US)

(73) Assignee: Inductoheat, Inc., Madison Heights, MI (US)

( * ) Notice: Subject to any disclaimer, the term of this patent is extended or adjusted under 35 U.S.C. 154(b) by 400 days.

(21) Appl. No.: 12/688,878

(22) Filed: Jan. 16, 2010

(65) Prior Publication Data

US 2010/0181305 A1 Jul. 22, 2010

Related U.S. Application Data

(60) Provisional application No. 61/145,541, filed on Jan. 17, 2009.

(51) Int. Cl.
*H05B 6/10* (2006.01)
(52) U.S. Cl. .................. 219/635; 219/652; 336/61

(58) Field of Classification Search .......... 219/635, 219/639, 652, 673; 336/61
See application file for complete search history.

(56) References Cited

U.S. PATENT DOCUMENTS

| | | | |
|---|---|---|---|
| 6,274,857 B1 * | 8/2001 | Loveless et al. | 219/639 |
| 7,482,559 B2 | 1/2009 | Cao et al. | |
| 2004/0183637 A1 * | 9/2004 | Rudnev et al. | 336/61 |
| 2008/0035633 A1 | 2/2008 | Weiss et al. | |
| 2009/0078697 A1 * | 3/2009 | Ziegler | 219/642 |

* cited by examiner

*Primary Examiner* — Phuc Dang
(74) *Attorney, Agent, or Firm* — Philip O. Post

(57) ABSTRACT

Apparatus and method are provided for induction heating of one or more components of a complex-shaped workpiece. The component is positioned within an opening formed by opposing pairs of arcuate coil structures formed in opposing inductor segments. One inductor segment is formed from electrically isolated inner and outer active inductor segments connected to one or more power supplies, while the other inductor segment is formed from electrically isolated inner and outer passive inductor segments that are magnetically coupled with respective inner and outer active inductor segments. Changing the output electrical parameters of the one or more power supplies controls the induction hardening along the transverse width of the workpiece with optional flux concentrators between opposing pairs of arcuate coil structures.

20 Claims, 18 Drawing Sheets

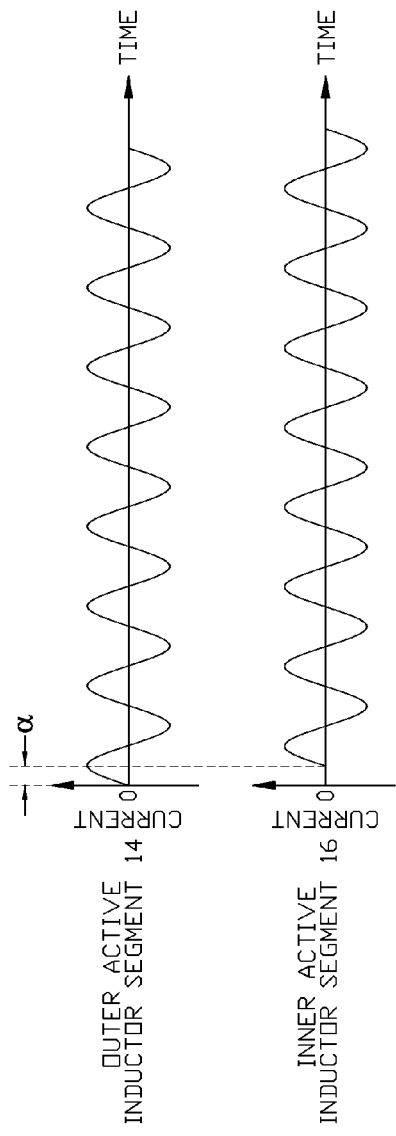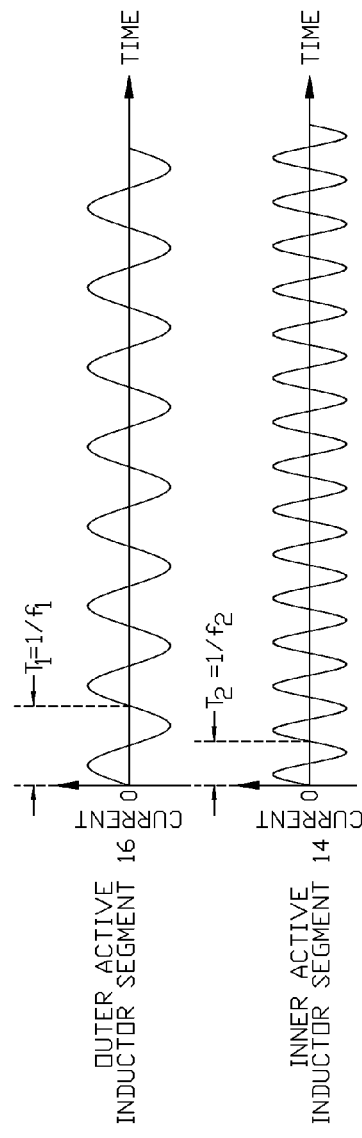

INDUCTION HEAT TREATMENT OF COMPLEX-SHAPED WORKPIECES

CROSS REFERENCE TO RELATED APPLICATIONS

This application claims the benefit of U.S. Provisional Application No. 61/145,541, filed Jan. 17, 2009, hereby incorporated by reference in its entirety.

FIELD OF THE INVENTION

The present invention generally relates to induction heat treatment of complex-shaped metal workpieces having one or more generally cylindrically-shaped components.

BACKGROUND OF THE INVENTION

U.S. Pat. No. 6,274,857 (the 857 patent), incorporated herein by reference in its entirety, discloses a method of, and apparatus for, induction heat treatment of irregularly shaped workpieces such as selected components of a crankshaft. Using the reference numbers of, and referring to the figures in the 857 patent, a typical mating pair of bottom and top inductor segments (107) and (109), respectively, is illustrated in patent FIGS. 2(a), 2(b) and 2(c). The bottom inductor segment is connected to an alternating current (ac) power supply at power termination region (122) to form a single series loop active circuit from a pair of coil segments located around through opening (117a). Therefore the bottom inductor segment is also referred to as the active inductor segment. The corresponding top inductor segment (patent FIG. 2(b)) is a single turn closed loop coil, and can also be referred to as the passive inductor segment. At least one pair of coil lips, for example, coil lips (123a) and (123b) are formed around a partial opening, for example partial opening (121a), in at least one of the coil segments. A second pair of coil lips are formed in the top inductor segment, for example, around partial opening (121b) so that when the mating pair of bottom and top inductors segments are in the closed position, as shown in patent FIG. 2(c), a substantially closed inductor is formed around workpiece component (207) as shown, for example, in patent FIG. 6(a). Workpiece component (207) may be, for example, a crank pin on a crankshaft to which a piston connecting rod will be attached after metallurgical hardening. The pin may be attached at either end to counterweights (irregularly shaped adjacent workpiece components (206) and (208) in patent FIG. 6(b) or 6(c)). When the bottom and top inductor segments are in the closed position and alternating current is supplied to bottom segment inductor (107), magnetic flux concentrators, for example concentrators (103a) and (103b) in patent FIG. 2(c), are used to magnetically couple the flux created around the bottom inductor segment caused by current flow in the bottom (active) inductor segment so that a current flow having an instantaneous direction opposite to that in the bottom segment inductor is induced in the top (passive) inductor segment. In the closed position, dielectric material (410) separates the opposing facing surfaces of the bottom and top inductor segments as shown in patent FIG. 2(c). One or more side shields (137), as illustrated in patent FIG. 5(a) can be provided on one, or both, inner and outer sides of a coil segment around the arcuate coil region formed around a coil lip to serve as a magnetic flux concentrator for the workpiece component being heat-treated, and as a magnetic field shield for the workpiece components adjoining the heat-treated component. While the above describes a single turn, single coil for the bottom and top segment inductors, the 857 patent also discloses that a single coil, with two or more turns for either, or both, of the bottom and top inductor segments can be provided to harden relatively large individual workpiece components.

U.S. Pat. No. 6,859,125 (the 125 patent), incorporated herein by reference in its entirety, discloses an improvement of the 857 apparatus and method of induction heat treatment of irregularly shaped workpieces. Using the reference numbers of, and referring to the figures in the 125 patent, the bottom inductor segment (17) is connected to an alternating current power supply at power termination region (122a) and (122b) to form a double parallel loop active circuit from coil turns (16) and (18) as shown in patent FIG. 5. Current restricting slit (14) is used to form the double parallel loop active circuit and provide a more uniform current distribution across the parallel connected adjacent pair of coil segments. At least one of the parallel connected adjacent coil segment pairs has a partial opening, such as partial opening (21a) in coil segment (17a) in which an arcuate coil surface is formed. The arcuate coil surface can be formed into a pair of coil lips that are each separated by an orifice, as representatively shown in patent FIG. 5 as inner coil lips (23b), outer coil lips (23a), and orifice (31) in each of the adjacent coil segments. The coil lips are profiled to selectively compensate for the irregular mass of the irregularly-shaped component, for an opening on the surface of the substantially cylindrical component, or for selective heating of the fillet. Active inductor segment (17) may be mated with a single turn passive inductor segment as disclosed in the 125 patent. Alternatively active inductor segment (17) may be mated with two turn passive inductor segment (19) as shown in patent FIG. 6, or passive inductor segment (29) in patent FIG. 7, which is split into two electrically isolated coils (32) and (33) by cross sectional current restricting slit (30). When active inductor segment (17) is mated with one of the passive inductor segments, a workpiece can be inductively heated with the coil lip pairs as disclosed in the 125 patent.

The 125 and 857 patents generally address what is known as "band" heat treatment of workpiece components. For example where the selected workpiece component 207' to be heat treated is the previously described crank pin, uniform heat treatment is generally required across the entire transverse surface region A' of the pin as shown in FIG. 1(a) appended hereto, rather than fillet regions 207a' and 207b', which comprise the interface regions between workpiece component 207' and adjacent irregularly-shaped components 206' and 208'. Consequently, as illustrated in FIG. 1(a) and FIG. 1(b) appended hereto, the coil lips (bottom coil lip pair 123a' and 123b' partially shown in FIG. 1(a)) in the bottom and top inductor coil segments, 107' and 109', respectively, that surround workpiece component 207', in combination, form a "band" of uniform induced heat around the entire transverse surface region A' of the pin. FIG. 1(a) also shows representative side shields 137', and FIG. 1(b) also shows representative dielectric 410' that separates the facing surfaces of the bottom and top inductor coil segments.

The 857 patent discloses embodiments for heat treating the fillet regions B', in combination with entire transverse surface region A' of a workpiece component, by forming outward pointed tip regions on the coil lips 124a' and 124b' as shown, for example, in FIG. 2(a) appended hereto.

The 125 patent discloses positioning the pair of opposing coil lips in a pair of paralleled coil turns separated by a cross sectional current restricting slit so that they inductively heat only the fillet regions B' between the selected workpiece component situated between a pair of coil segments and its adjoining workpiece component. As illustrated in FIG. 2(b)

appended hereto, this is accomplished by making the between-coil-segments' cross sectional current restricting slit, S, relatively wide—in the range of 6 mm to 25 mm as taught by the 125 patent. First pair of coil lips 23a' and 23b' are on one side the slit, while second pair of coil lips 23c' and 23d' are on the opposing side of the slit. As disclosed in the 125 patent, the wide slit may be filled with a flux concentrator 138' to further direct induction heating to the fillet regions B'.

The teachings of the 125 and 857 patents for heat treatment of only the fillet regions of a component workpiece, or selective heat treatment of the fillet regions and/or selective regions along the transverse width of the component workpiece, and metallurgical hardening of both the fillet and surface regions are somewhat limited. For example, where the component workpiece is a crankshaft pin or main journal having a narrow (for example, less than 30 mm wide) transverse bearing area (width), a "thumbnail" heating pattern C' can result as shown in FIG. 3(a) and FIG. 3(b) appended hereto when utilizing the teachings of the 857 and 125 patents, respectively. The thumbnail heating pattern is generally not desirable due to several factors. First, such a heating pattern wastes energy since middle hardness depth must be appreciably deeper than necessary to achieve a satisfactory hardness depth towards the fillet regions. Secondly, such a heating pattern causes increased distortion of the heated component since increased heat absorption results in greater volumetric expansion of the component. Taking into consideration the shape of a complex workpiece, such as a crankshaft, the greater metal expansion leads to correspondingly greater shape distortion. In addition, the greater amount of metal heated above the phase transformation temperature results in a corresponding increase in lower temperature transformation structures such as martensite, lower bainite, and others, which in turn have different volumetric densities compared to the preheated metallurgy of the workpiece component. This also increases the shape/size distortion of the heat treated workpieces that has a "thumbnail" pattern. This thumbnail pattern can occur even though there is an absence of electrically conductive coil lips in regions 120' between paired inner and outer active circuit coil lips 123a' and 123b' in FIG. 3(a), and regions 120'' between slit S, and paired coil lips 23a'/23b' and 23c'/23d' in FIG. 3(b). The thumbnail heating pattern can result from sufficient electromagnetic coupling between inner and outer coil lip pairs to create a sufficiently strong magnetic flux field in the center transverse region $A'_1$ of the workpiece component shown in FIG. 3(a) and in the of center transverse regions $A'_2$ of the workpiece component shown in FIG. 3(b). There is also reduced magnetic field strength in the opposing transverse end regions $A'_3$ of the bearing surfaces due to the electromagnetic end effect of the inductor. Further there is an appreciable thermal heat sink effect due to the presence of the relatively cold (non-inductively heated) irregularly-shaped counterweights 206' and 208' located near both ends of the workpiece component 207; that is any inductive heating in end regions $A'_3$ is conducted away from each transverse end region of the workpiece component and towards the adjacent irregularly shaped workpiece component.

One object of the present invention is to provide apparatus for, and method of, metallurgical heat treatment of cylindrical components of a complex workpiece, such as a crankshaft.

Another object of the present invention is to broadly control the induction hardening of cylindrical components of a complex workpiece across the transverse width and fillet areas of the cylindrical components.

BRIEF SUMMARY OF THE INVENTION

In one aspect, the present invention is an inductor assembly for, and method of, inductively heat treating at least one substantially cylindrical component of a metal workpiece where the substantially cylindrical component is attached on at least one side to an irregularly-shaped component to form a fillet between the irregularly-shaped component and the substantially cylindrical-shaped component. The inductor assembly is formed from an active and passive inductor segments. The active inductor segment is connected to one or more alternating current power supplies, and the passive inductor segment is magnetically coupled to the active inductor segment. The active inductor segment comprises inner and outer active inductor segments that are electrically isolated from each other. Both the outer and inner active inductor segments have at least one pair of adjacent partial through openings in which arcuate coil lip structures are formed. That is, an outer active coil lip is formed in the partial through opening in the outer active inductor segment, and an inner active coil lip is adjacently formed in the partial through opening in the inner active inductor segment. The passive inductor segment comprises inner and outer passive inductor segments that are electrically isolated from each other, and have a corresponding outer passive coil lip and inner passive coil lip. When the outer and inner active coil lips respectively mate with the outer and inner passive coil lips, a generally cylindrical interior volume is formed within which the workpiece component can be inductively heat treated.

An inter-lips magnetic flux concentrator may be positioned between the inner and outer active and/or inner and outer passive pair of coil lips to control the induced metallurgical hardness pattern across the transverse width of the workpiece component.

A cross-lips magnetic flux concentrator may be positioned around the active and/or passive pair of coil lips to control the induced metallurgical hardness pattern across the transverse width of the workpiece component.

The electrical parameters of the alternating current supplied to the inner and outer active and passive inductor coil segments may be varied independently of each other to control the induced metallurgical hardness pattern across the transverse width of the workpiece component.

In other examples of the invention, the inductor assembly may be formed from two active inductor segments without magnetic coupling between the two active inductor segments.

The above and other aspects of the invention are set forth in this specification and the appended claims.

BRIEF DESCRIPTION OF THE DRAWINGS

The appended drawings, as briefly summarized below, are provided for exemplary understanding of the invention, and do not limit the invention as further set forth in this specification and the appended claims.

FIG. 5(a)' and FIG. 5(a)" illustrate in partial cross sectional views the arrangement shown in FIG. 5(a) with alternative instantaneous current flow patterns used during the induction heat treatment process.

FIG. 9(a) graphically illustrates current phase control between currents in the inner and outer active inductor segments.

FIG. 9(b) graphically illustrates frequency control between currents in the inner and outer active inductor segments.

FIG. 13(a)' and FIG. 13(a)" illustrate comparative control of magnetic flux paths with, and without, cross-lips magnetic flux concentrators, respectively.

DETAILED DESCRIPTION OF THE INVENTION

Figure 4A:
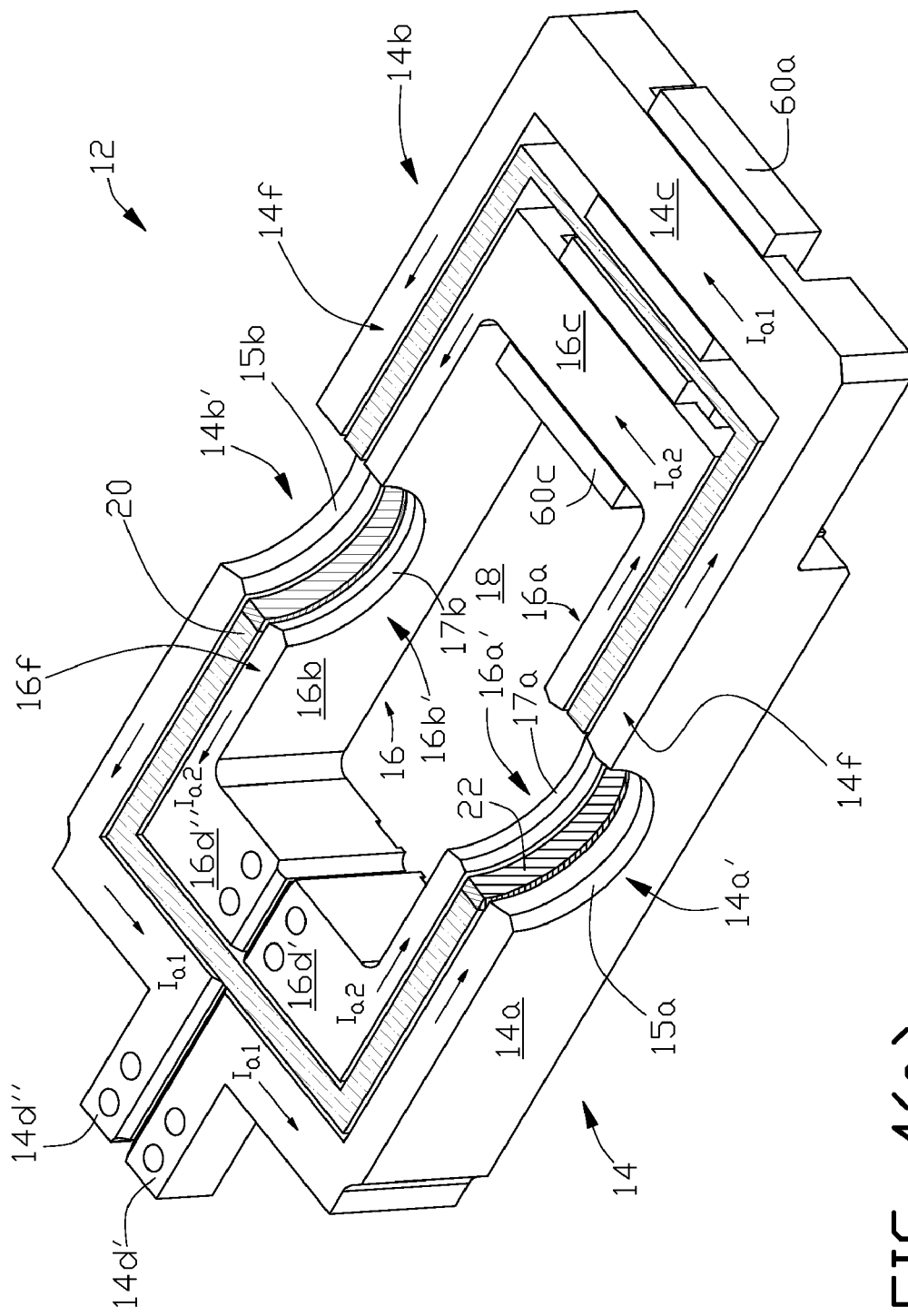
FIG. 4(a) illustrates in isometric view one example of an active inductor segment used in the inductor assembly of the present invention.
Figure 4B:
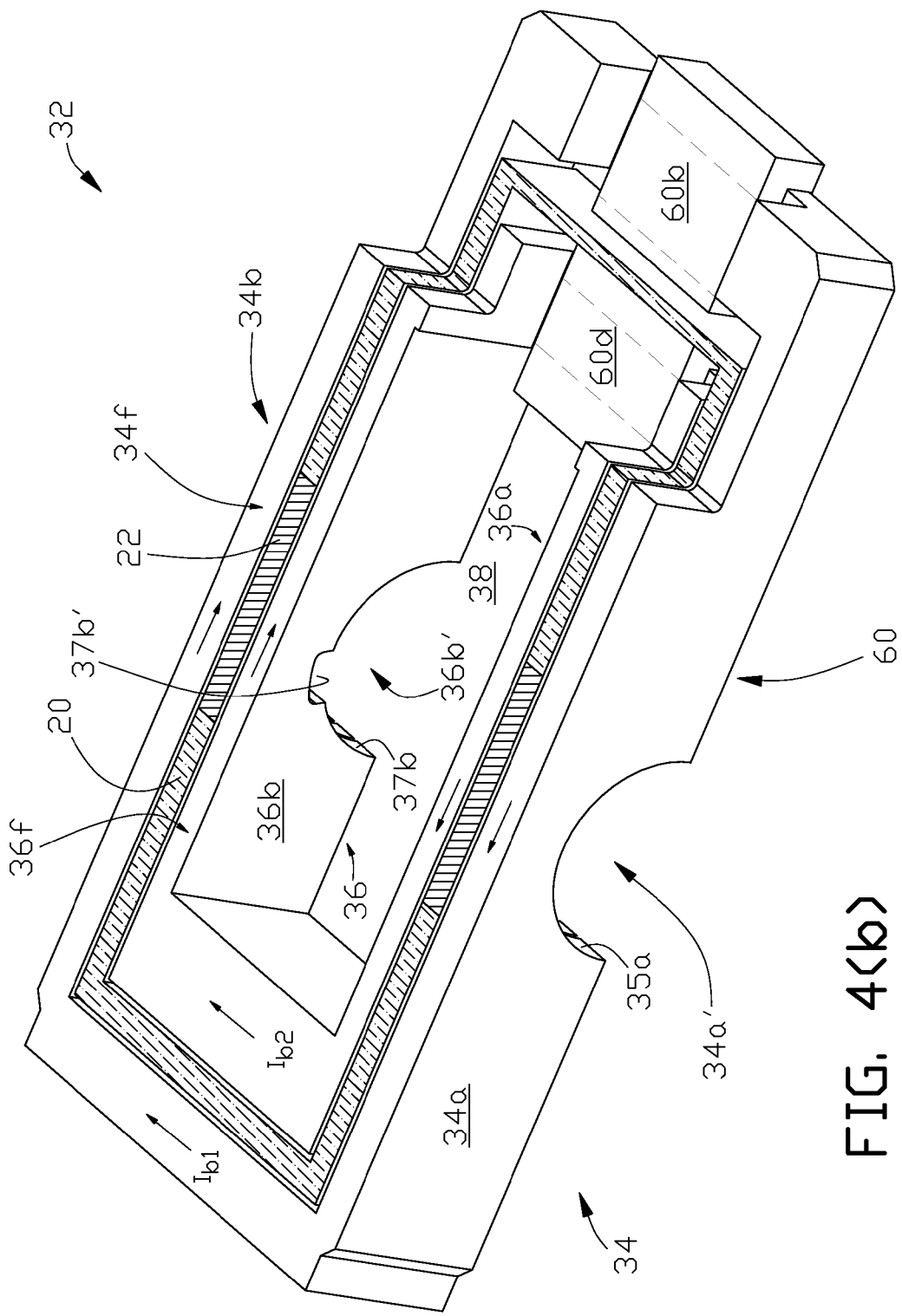
FIG. 4(b) illustrates in isometric view one example of a passive inductor segment used in the inductor assembly of the present invention.
Figure 4C:
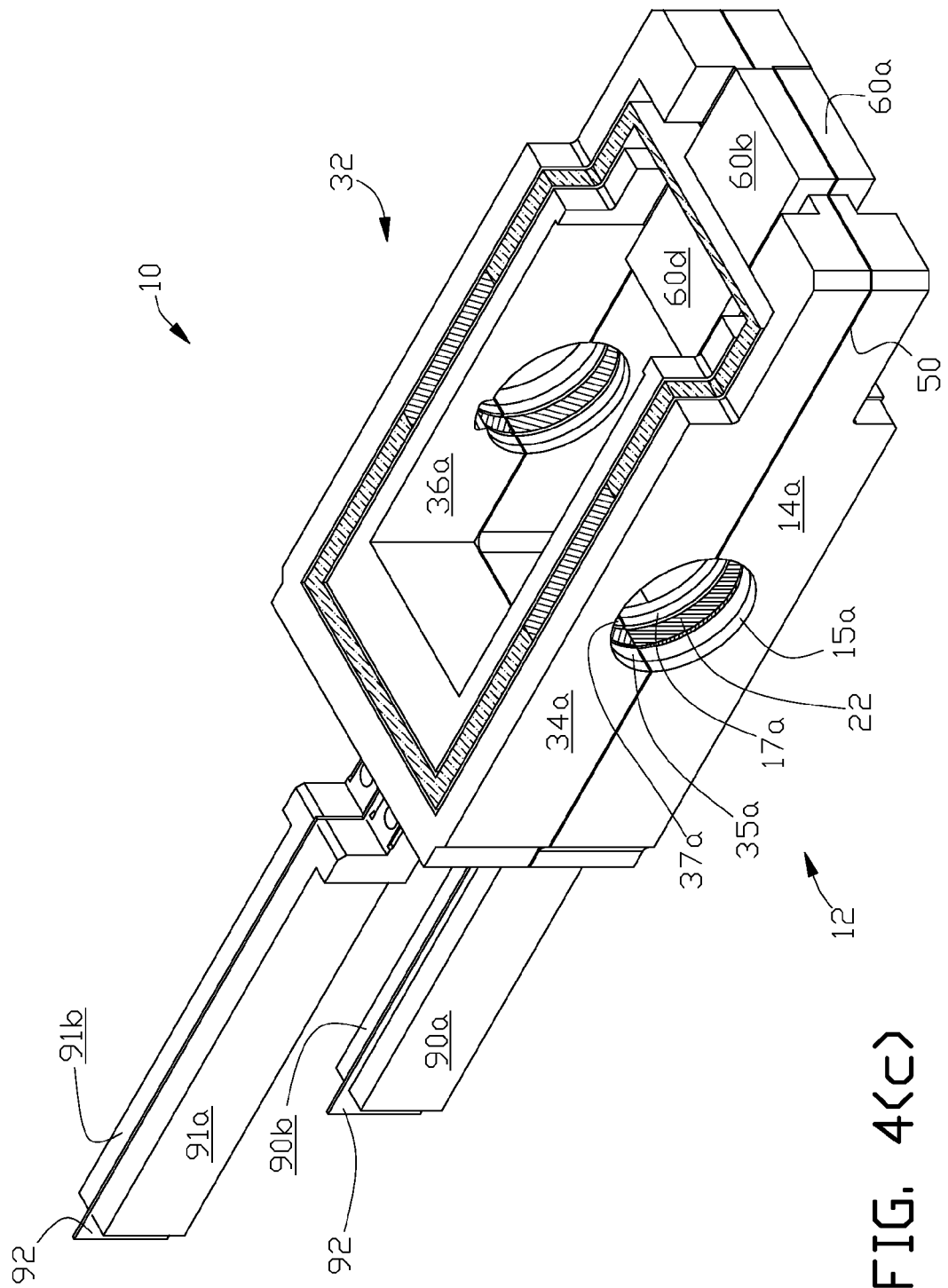
FIG. 4(c) illustrates in isometric view one example of an inductor assembly of the present invention formed from the active and passive inductor segments shown in FIG. 4(a) and FIG. 4(b).

Referring now to the drawings, wherein like numerals indicate like elements, there is shown in FIG. 4(a), FIG. 4(b) and FIG. 4(c), one non-limiting example of inductor assembly 10 of the present invention that is used for metallurgical heat treatment of at least one cylindrical component making up a metal workpiece. Inductor assembly 10 comprises active inductor segment 12 and passive inductive segment 32. The active inductor segment is connected to at least one power supply, while the passive inductor segment is magnetically coupled with the active inductor segment and not connected directly to a power source.

Referring primarily to FIG. 4(a) active inductor segment 12 comprises outer active inductor segment 14 and inner active inductor segment 16, which are electrically isolated from each other. The inner active inductor segment is positioned within a through opening formed by the outer active inductor segment, which through opening is formed interior to the outer active inductor segment 14.

Outer active inductor segment 14 comprises a pair of opposing first 14a and second 14b outer active inductor coil segments, magnetic flux coupling region 14c, and power termination regions 14d' and 14d", all of which are interconnected around interior through opening 18. At least one of the outer active inductor coil segments has at least one partial through opening, such as openings 14a' and 14b' shown in FIG. 4(a). The arcuate surface region of each partial through opening can be contoured to form an active outer coil lip, such as coil lips 15a and 15b in FIG. 4(a). Outer active inductor segment 14 can be connected to at least one power supply circuit at power termination regions 14d' and 14d" as further described below.

Inner active inductor segment 16 comprises a pair of opposing first 16a and second 16b inner active inductor coil segments, magnetic flux coupling region 16c, and power termination regions 16d' and 16d", all of which are interconnected around interior through opening 18 that is formed when the inner active inductor coil segment is positioned within the through opening interior to the outer active inductor segment. At least one of the inner active inductor coil segments has at least one partial through opening, such as openings 16a' and 16b' as shown in FIG. 4(a). The arcuate surface region of each partial through opening can be contoured to form an active inner coil lip, such as coil lips 17a and 17b in FIG. 4(a). Inner active inductor coil segment 16 can be connected to at least one power supply circuit at power termination regions 16d' and 16d" as further described below.

With the arrangement shown in FIG. 4(a) a first pair of outer and inner active coil lips is formed by coil lips 15a and 17a, respectively, and a second pair of outer and inner active coil lips is formed by coil lips 15b and 17b.

Electrical isolation between the outer and inner active inductor segments is achieved by providing dielectric space 20 (shown in broken cross hatched shading in FIG. 4(a)) between the segments. In at least the region between at least one opposing active coil lips in a pair of outer and inner active coil lips, at least one inter-lips flux concentrator 22 (shown in solid cross hatched shading in FIG. 4(a)) is provided as further described below. Dielectric space 20 may be air separation or any suitable solid or gas dielectric material.

Referring primarily to FIG. 4(b) passive inductor segment 32 comprises outer passive inductor coil segment 34 and inner passive inductor coil segment 36, which are electrically isolated from each other. The inner passive inductor coil segment is positioned within through opening 38, which is formed interior to the outer passive inductor coil segment 34.

Outer passive inductor segment 34 comprises a pair of opposing first 34a and second 34b outer passive inductor coil segments, and magnetic flux coupling region 34c (hidden under coupling flux concentrator 60b in FIG. 4(b)), all of which are interconnected around interior through opening 38 to form a closed loop electrical circuit. At least one of the outer passive inductor coil segments has at least one partial through opening, such as openings 34a' and 34b', with opening 34a' visible in FIG. 4(b). The arcuate surface region of each partial through opening can be contoured to form a passive outer coil lip, such as coil lips 35a and 35b, with lip 35a partially visible in FIG. 4(b).

Inner passive inductor segment 36 comprises a pair of opposing first 36a and second 36b inner passive inductor coil segments and magnetic flux coupling region 36c (hidden under coupling flux concentrator 60d in FIG. 4(b)), all of which are interconnected around reduced volume interior through opening 38 that is formed when the inner passive inductor coil segment is positioned within the through opening formed interior to the outer passive inductor segment. At least one of the inner passive inductor coil segments has at least one partial through opening, such as openings 36a' and 36b', with opening 36b' visible in FIG. 4(b). The arcuate surface region of each partial through opening can be contoured to form a passive inner coil lip, such as coil lips 37a and 37b, with lip 37b partially visible in FIG. 4(b).

With the arrangement shown in FIG. 4(b) a first pair of outer and inner passive coil lips is formed by coil lips 35a and 37a, respectively, and a second pair of outer and inner active coil lips is formed by coil lips 35b and 37b.

Electrical isolation between the outer and inner passive inductor segments is achieved by providing dielectric space 20 (shown in broken cross hatched shading in FIG. 4(b)) between the segments. In at least the region between at least one opposing coil lips in a pair of coil lips, at least one inter-lips flux concentrator 22 (shown in solid cross hatched shading in FIG. 4(b)) is provided, as further described below. Dielectric space 20 may be air separation or any suitable solid or gas dielectric material.

FIG. 4(c) illustrates inductor assembly 10 when the active and passive inductor segments shown in FIG. 4(a) and FIG. 4(b) have their facing surfaces brought in proximate contact with each other while maintaining electrical contact isolation between the facing surfaces with a dielectric 50 disposed between the facing surfaces. Facing surfaces 14f and 16f for the outer and inner active inductor segments, respectively, are identified in FIG. 4(a) as the surfaces with arrows designating directions of current flow; facing surfaces 34f and 36f for the outer and inner passive segments, respectively, are identified in FIG. 4(b) as the surfaces with arrows designating directions of current flow. One or more coupling magnetic flux concentrators are used to form a magnetic circuit between the active and passive inductor segments as illustrated by coupling magnetic flux concentrators 60a and 60b for outer active 14 and passive 34 inductor segments, and coupling magnetic flux concentrators 60c and 60d for inner active 16 and passive 36 inductor segments. Each concentrator segment comprises a high permeability magnetic material such as a plurality of laminated steel sheets or powder-type magnetic material that comprises iron-based or/and ferrite-based particles bonded together using a binder material. The outer 14 and inner 16 active inductor segments can have their power termination regions, 14d'/14d'' and 16d'/16d'', respectively, connected directly or indirectly to a power supply circuit, for example, by bus bars 90a/90b and 91a/91b, respectively, as shown in FIG. 4(c), with separation dielectric 92.

Figure 4D:
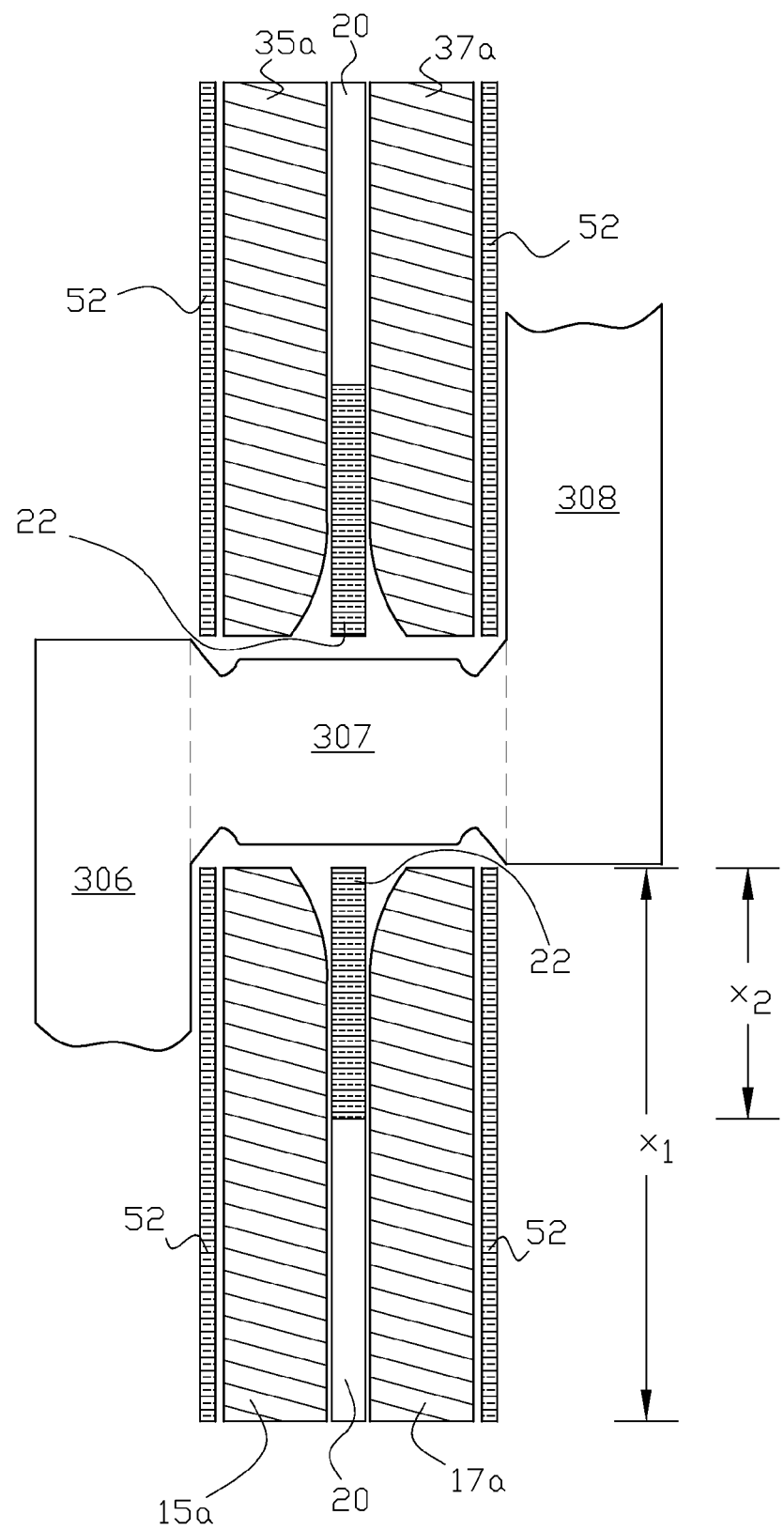
FIG. 4(d) illustrates in cross sectional view one example of a workpiece component positioned between opposing pairs of active and passive coil lips.

When properly positioned, each partial opening in an active inductor segment is generally positioned mirror image relative to its corresponding partial opening in the passive inductor segment. For example, for active inductor segment 12 shown in FIG. 4(a) workpiece partial opening 14a' and 16a' in the active outer and inner inductor coil segments, respectively, are generally positioned mirror image relative to workpiece partial openings 34a' and 36b' in the passive outer and inner inductor coil segments making up passive inductor segment 32 as shown in FIG. 4(b) to form a generally circular opening as shown in FIG. 4(c). Deviations from true mirror image active and passive inductor segments are used for some applications of the invention to accommodate particular features of the component being heat treated or a component adjacent thereto, such as a counterweight. For example notch 37b' in coil lip 37b (FIG. 4(b)) may be used only in the passive coil lip 37b and not the mirror image active coil lip 17b to account for a radially drilled hole in the workpiece that should not be overheated. Referring to FIG. 4(d), with this arrangement, a cylindrical workpiece component 307 to be heat treated can be situated in the generally circular opening between surrounding active paired coil lips 15a and 17a and passive paired coil lips 35a and 37a. Workpiece components 306 and 308 connected to opposing ends of component 307 represent irregularly shaped components that may be attached to either or both ends of component 307. If present, component 308 may sit in through openings 18 and 38, while component 306 may sit exterior to outer inductor coil segment 14a. One or more (slotted or powder-type iron-based or ferrite-based) side shields 52 can optionally be provided on one or both exterior sides of an active and/or passive inductor coil segment around the arcuate coil region of the inductor segment as shown in FIG. 4(d). An inter-lips flux concentrator 22 may be utilized as further described below. With suitable alternating current supplied from the power supply circuit to the outer and inner active inductor segments, when instantaneous alternating current flow ($I_{a1}$ and $I_{a2}$) in active inductor segment 12 is generally in the direction indicated by the arrows in FIG. 4(a), the induced instantaneous alternating current flow ($I_{b1}$ and $I_{b2}$) in passive inductor segment 32 is generally in the opposite direction as indicated by the arrows in FIG. 4(b), and generally cylindrical workpiece 307 will be inductively heat treated when positioned, for example, within a generally circular opening shown in FIG. 4(c). As further described below, these currents may be periodically reversed, phase shifted, and/or time shifted during a heat treatment process in order to produce a desired metallurgical hardening pattern in the workpiece component being heat treated.

Figure 5A:
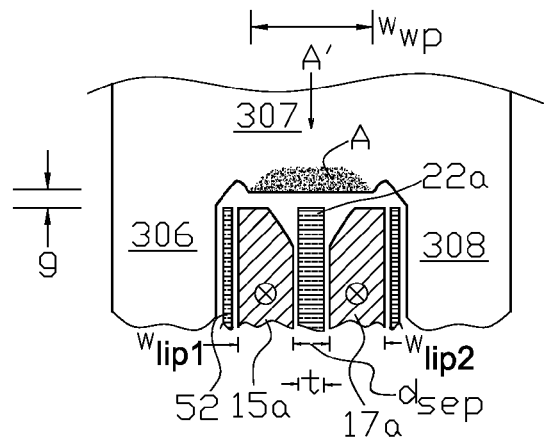
FIG. 5(a), FIG. 5(b) and FIG. 5(c) illustrate in partial cross sectional views typical examples of the use of inter-lips magnetic flux concentrators in the present invention.
Figure 5B:
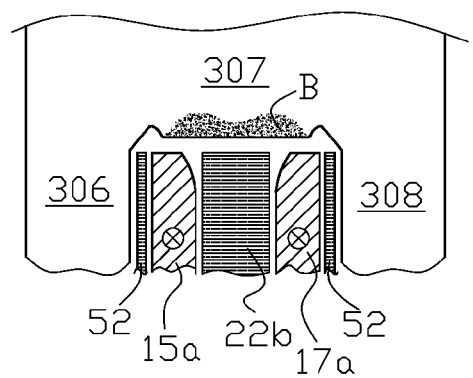
Figure 5C:
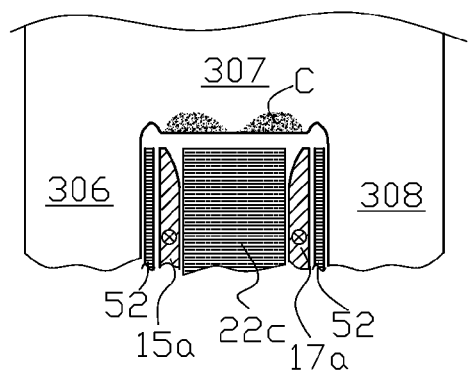
Figure 5A:
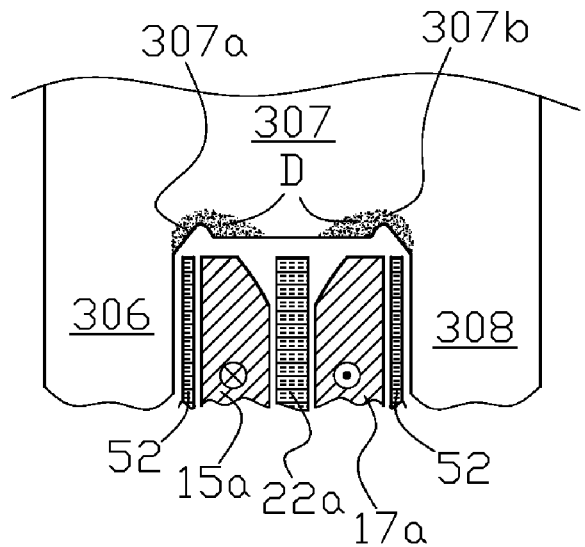
Figure 5A:
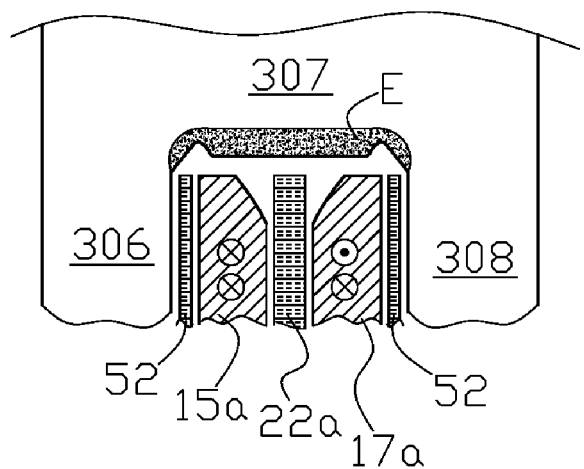
Figure 12:
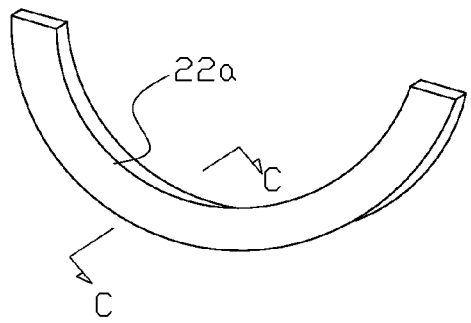
FIG. 12 illustrates in perspective view one non-limiting example of an inter-lips magnetic flux concentrator used in the present invention

As mentioned above, in some examples of the inductor assembly of the present invention, an inter-lips magnetic flux concentrator is used to control the metallurgical hardening pattern for an inductively heat treated, generally cylindrical workpiece component. FIG. 5(a), FIG. 5(b) and FIG. 5(c) are representative applications of inter-lips flux concentrators in the present invention. For simplicity the diagrams in these and other figures illustrate, in partial cross section, the interface region between workpiece component 307 and the active coil lip pair formed by outer 15a and inner 17a coil lips; the interface region between workpiece component 307 and passive coil lip pair formed by outer 35a and inner 37a coil lips are preferably similar, unless an asymmetrical hardening pattern is desired around the perimeter of component 307. A typical non-limiting inter-lips flux concentrator 22a is shown in FIG. 12 with cross sectional cut at line C-C as shown in other figures.

Figure 1A:
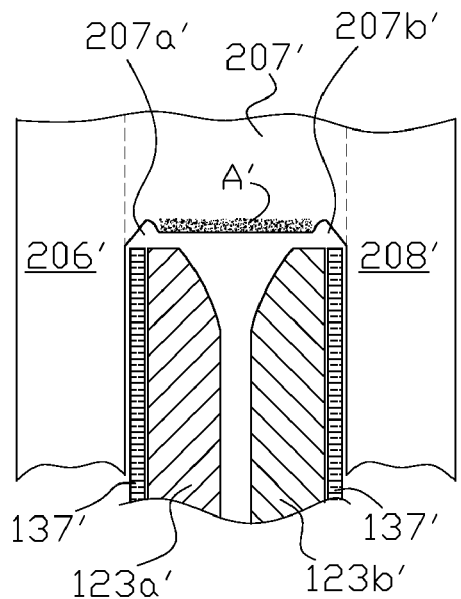
FIG. 1(a) and FIG. 1(b) illustrate the concept of band metallurgical heat treatment of a cylindrical workpiece component, with FIG. 1(a) being a partial cross sectional view through line A-A in FIG. 1(b).
Figure 1B:
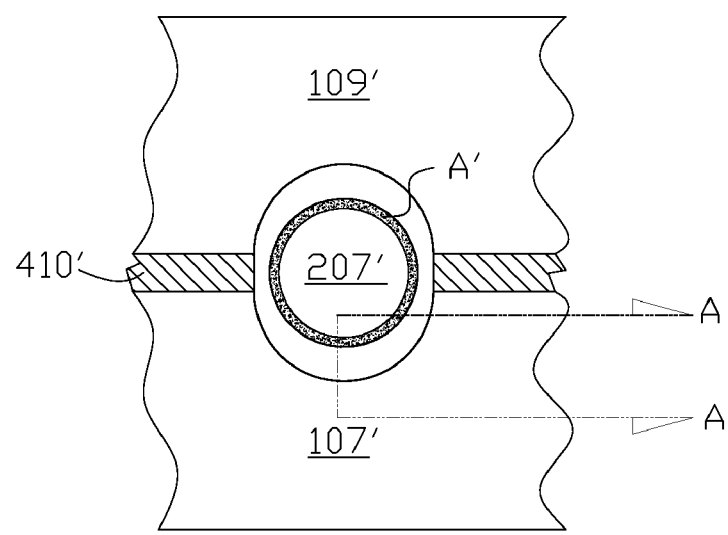
Figure 2A:
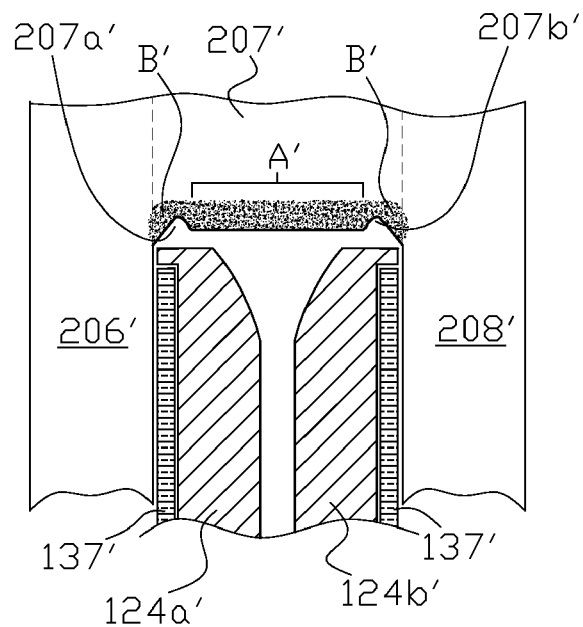
FIG. 2(a) is a partial cross sectional elevation view of a prior art apparatus for heat treatment of a cylindrical workpiece component across its entire transverse surface region.
Figure 2B:
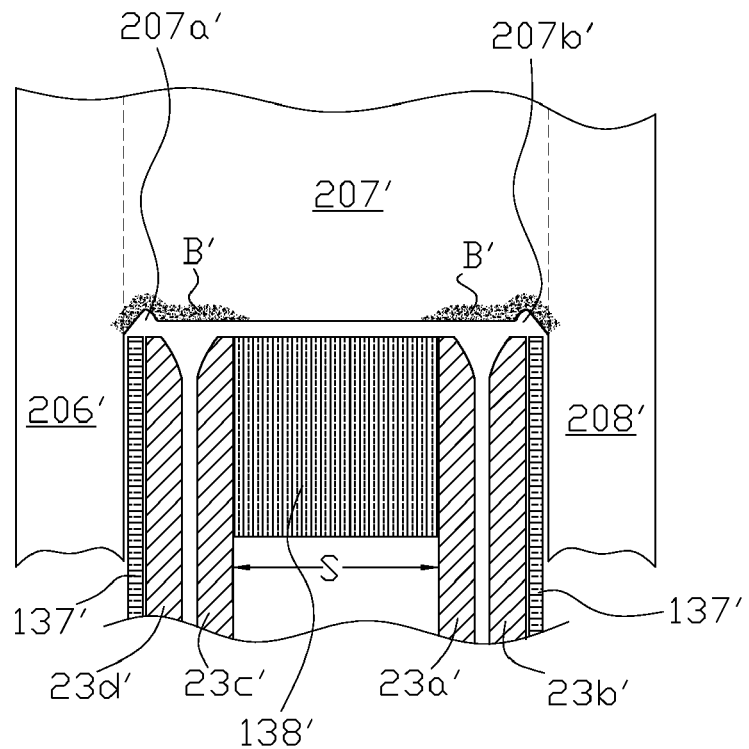
FIG. 2(b) is a partial cross sectional elevation view of a prior art apparatus for heat treatment of primarily the fillet regions of a cylindrical workpiece.
Figure 3A:
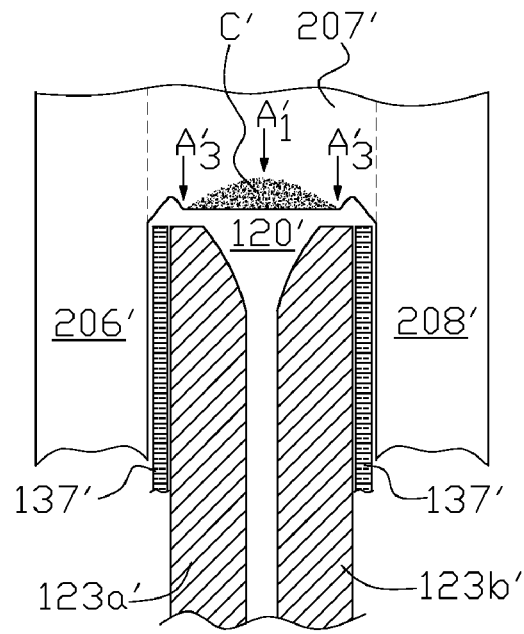
FIG. 3(a) and FIG. 3(b) are partial cross sectional views of typically undesirable thumbnail metallurgical heat treated patterns across the transverse width of a cylindrical workpiece component.
Figure 3B:
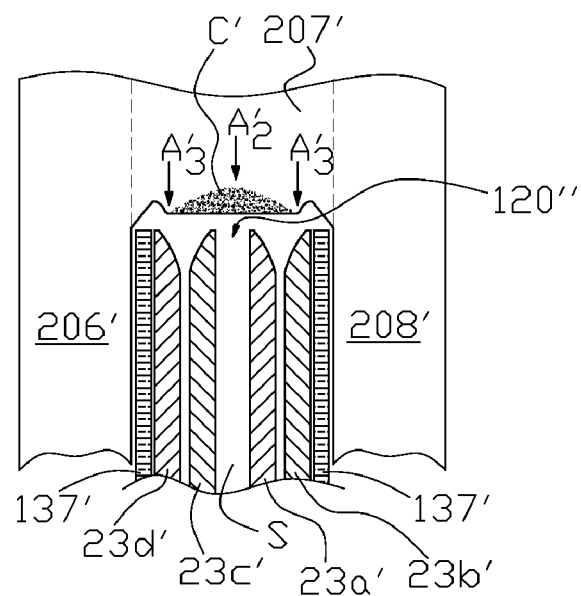

Depending upon the widths, $w_{lip1}$ and $w_{lip2}$ of the coil lips, the inter-lips separation distance, $d_{sep}$ and the desired metallurgical hardening patterning, inter-lips magnetic flux concentrators 22a, 22b or 22c may be utilized as shown in FIGS. 5(a), 5(b) and 5(c), respectively. The inter-lips flux concentrators may fill a part of, or the total distance, $d_{sep}$, between paired coil lips. The inter-lips concentrators do not need to extend the entire length, $x_1$, between the paired coil lips as illustrated in FIG. 4(d). Generally the inter-lips concentrators need to extend from the transverse tips of the paired coil lips to a distance of $x_2$ so that the magnetic flux generated by each coil lip is separated from each other proximate to the transverse surface of the workpiece component being heat treated. The presence of an inter-lips magnetic flux concentrator attenuates electromagnetic coupling between the paired coil lips, which reduces induced heating in the central region A' (FIG. 5(a)) of workpiece component 307, such as a bearing, that is being heat treated. This is contrasted with the prior art arrangement shown in FIG. 3(a) and discussed above. The combination of an inter-lips magnetic flux concentrator and paired coil lips is particularly advantageous when heat treating a narrow width, $w_{wp}$, workpiece component, such as a journal on a crankshaft. Selection of inter-lips geometric parameters is based on the metallurgical hardness pattern desired from a paired coil lips for a given workpiece component to be heat treated. Referring to FIG. 5(a) these geometric parameters include thickness, t, air gap distance, g, between inter-lips concentrator and the (bearing) surface of the heat treated workpiece component, and/or the concentrator's electromagnetic properties, namely magnetic permeability and electrical resistivity. For example thickness, t, must be sufficient to prevent magnetic saturation in a particular application.

In FIG. 5(a) hardness pattern A, with a substantially uniform depth hardness pattern across the width, $w_{wp}$, of the workpiece component, is achieved by decreasing induced power density (heat source) in the mid-width of the hardness pattern by controlling the geometric parameters described above to substantially reduce the appearance of a thumb-nail pattern.

In FIG. 5(b) hardness pattern B, with a symmetrical double lobe, variable depth hardness pattern across the width of the workpiece component, is achieved by increasing the thickness of inter-lips concentrator 22b over that of concentrator 22a in FIG. 5(a), thus further decreasing induced power density (heat source) in the mid-width of the hardness pattern for the shallower hardness depth shown in FIG. 5(b).

In FIG. 5(c) hardness pattern C, with a symmetrical double thumbnail hardness pattern across the width of the workpiece component, is achieved by further increasing the thickness of inter-lips concentrator 22c over that of concentrator 22b in FIG. 5(b) to eliminate hardening in the mid-width region as shown in the figure.

In general in transitioning from the hardness patterns shown in FIG. 5(a) through FIG. 5(c), the distance, $d_{sep}$, between the paired active coil lips is increasing and the thickness, t, of the utilized inter-lips flux concentrator is also increasing.

A particular advantage of the inductor assembly of the present invention over the prior art is that electrical current parameters, such as, current phase shift, frequency and, current time phase shift can be independently varied, either alone or in combination with each other, for the outer and inner active inductor segments, during some, or all, of the steps in the induction heat treatment process, to precisely control the metallurgical hardening pattern across the transverse width of the workpiece component to be inductively heated.

Figure 6A:
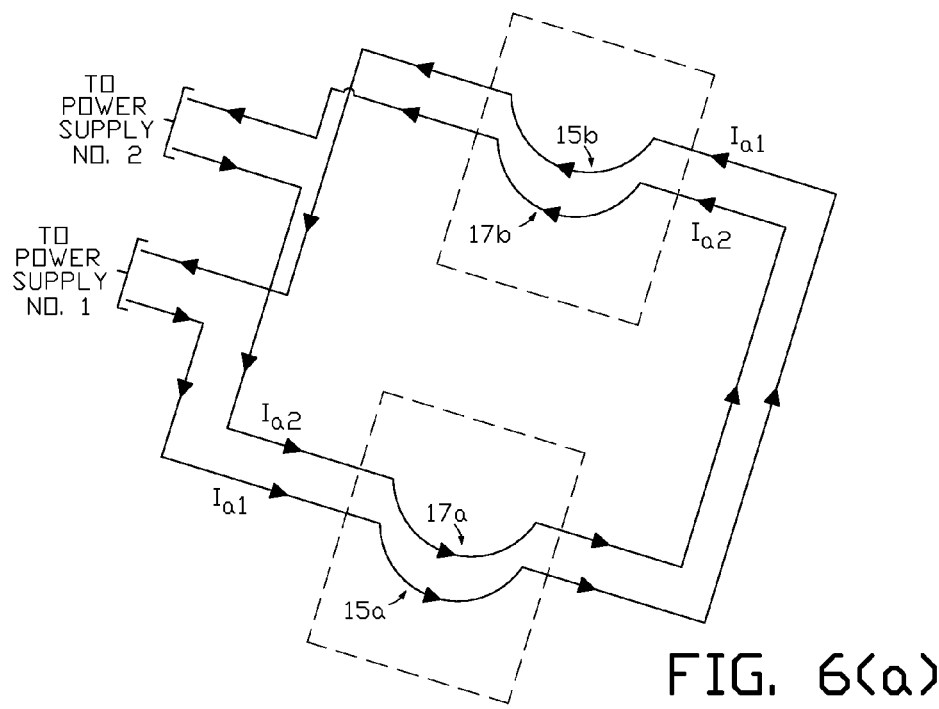
FIG. 6(a) and FIG. 6(b) diagrammatically illustrate two alternative power supply circuits for supplying in-phase current to both inner and outer active inductor segments.
Figure 6B:
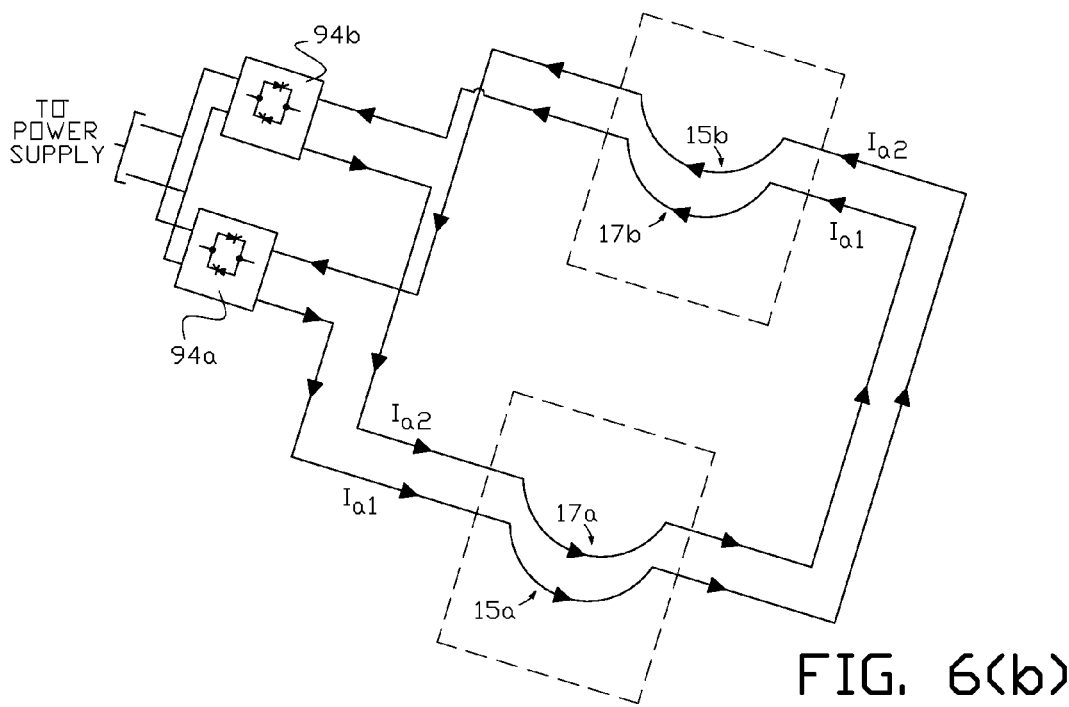

In the figures conventional notation is used to indicate the instantaneous direction of current flow; that is, a cross in a circle indicates alternating current flow into the plane of the paper and away from the reader, and a dot in a circle indicates alternating current flow out of the plane of the paper (180 degrees out of phase from current flow into the plane of the paper) and towards the reader. The examples in FIG. 5(a), FIG. 5(b) and FIG. 5(c) all illustrate various hardness patterns resulting from instantaneous current flow in the same direction in both of the paired coil lips. This can be achieved, for example, by utilizing the power supply circuit shown in FIG. 6(a) or FIG. 6(b). In FIG. 6(a) two power supplies are utilized, with POWER SUPPLY No. 1 connected to the outer active inductor segment and POWER SUPPLY No. 2 connected to the inner active inductor segment. Alternatively in FIG. 6(b) a single power supply is used while switching circuits 94a and 94b are used to control the instantaneous current flow between the same and opposing instantaneous directions to the outer and inner active inductor segments used to control output current from the single power supply to the outer and inner active inductor segments individually controlled and simultaneously powered active pair of lips 15a/15b and/or pair 17a/17b.

Figure 7A:
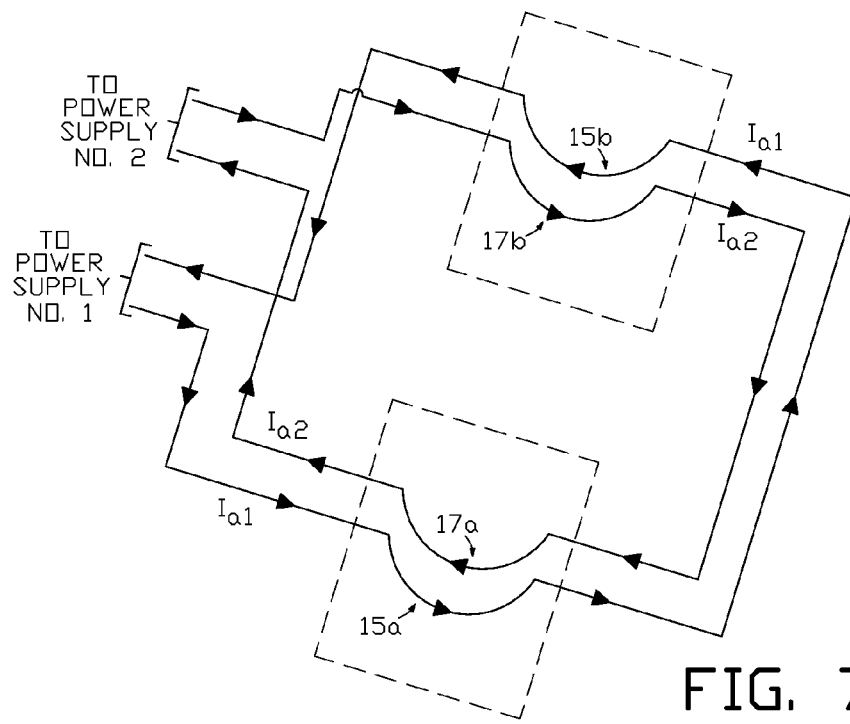
FIG. 7(a) and FIG. 7(b) diagrammatically illustrate two alternative power supply circuits for supplying 180 degrees out-of-phase current to the inner and outer active inductor segments.
Figure 7B:
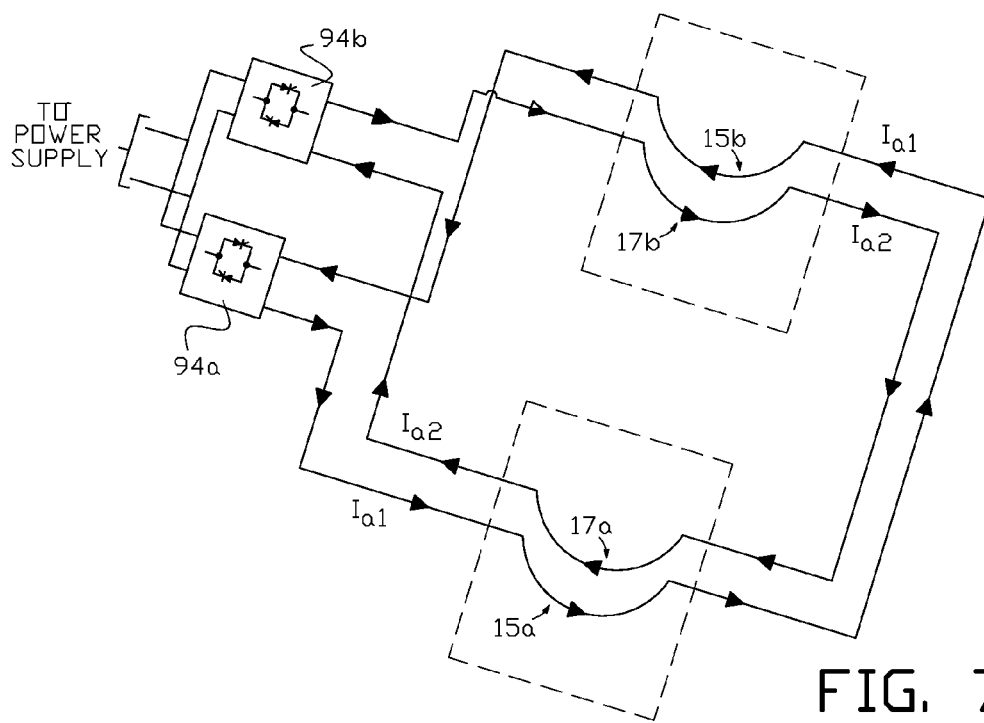
Figure 8A:
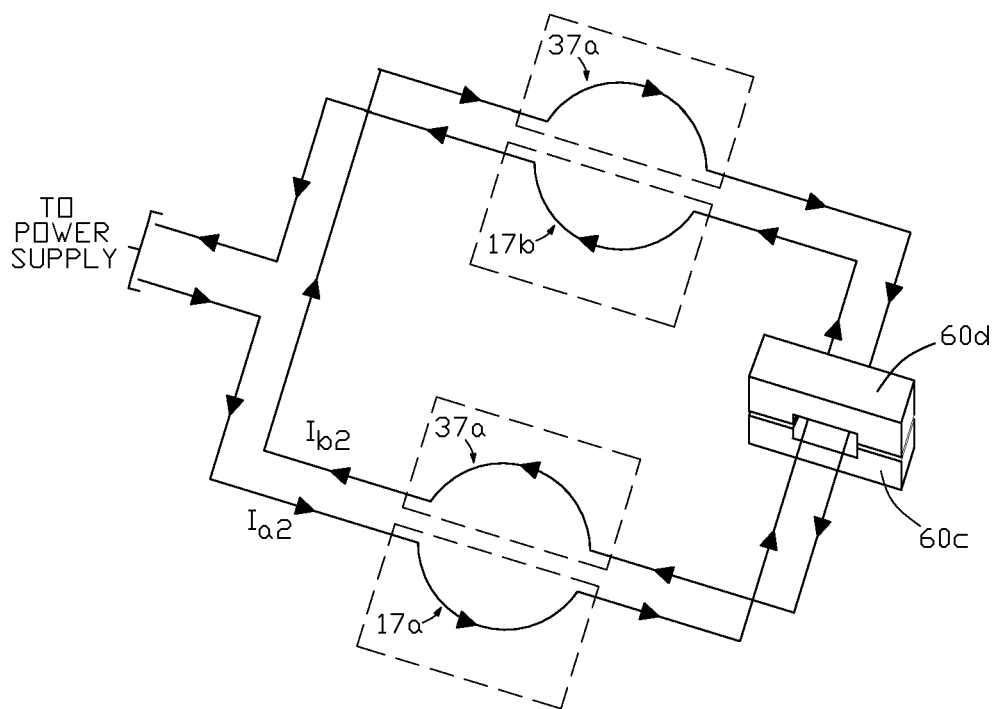
FIG. 8(a) and FIG. 8(b) diagrammatically illustrate instantaneous current direction for outer and inner paired active and passive inductor segments.
Figure 8B:
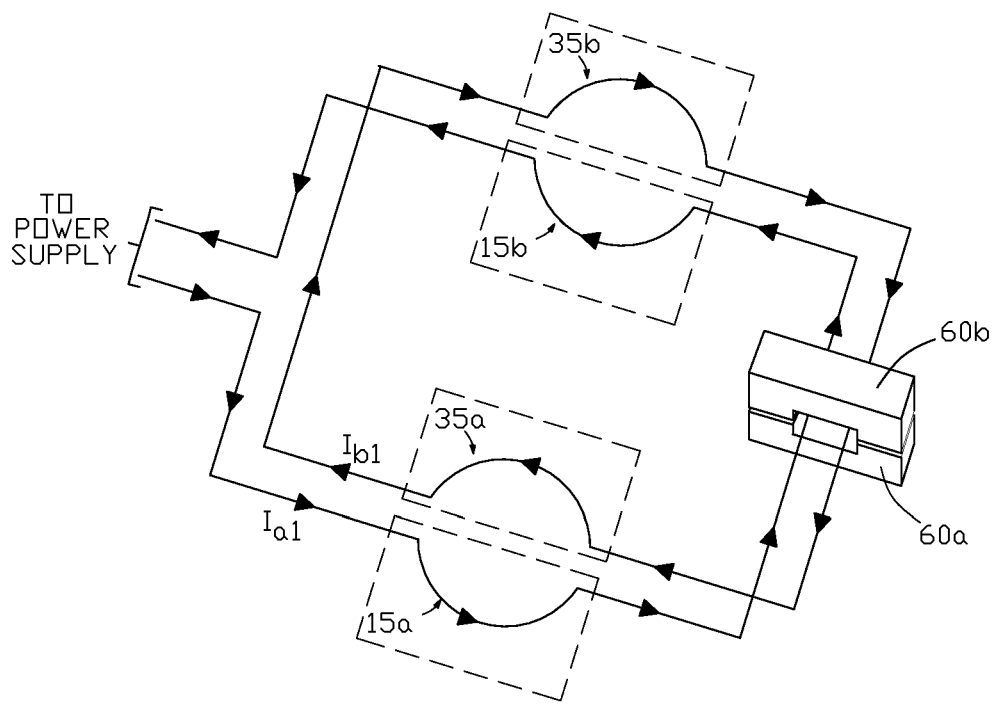

FIG. 5(a)' represents the arrangement in FIG. 5(a) where instantaneous current flow is in opposing directions in the paired coil lips. The use of inter-lips flux concentrator 22a with opposing current flows during the induction hardening process increases the electrical efficiency of the coil formed from the paired coil lips and migrates current coil density towards the fillet regions 307a and 307b to produce hardness pattern D. This can be achieved, for example, by utilizing the power supply circuit shown in FIG. 7(a) or FIG. 7(b). In FIG. 7(a) two power supplies are utilized, with POWER SUPPLY No. 1 connected to the outer active inductor segment and POWER SUPPLY No. 2 connected to the inner active inductor segment. Alternatively in FIG. 7(b) a single power supply is used while switching circuits 94a and 94b are used to control output current from the single power supply to the outer and inner active inductor segments.

FIG. 5(a)" illustrates another variant result that is achieved with the arrangement in FIG. 5(a) when instantaneous current flow is alternated between the same and opposing instantaneous directions during the induction hardening process; this method results in hardness pattern E where the fillet regions and entire transverse width of component 307 is hardened. This can be achieved, for example, by alternating between the power supply circuits shown in FIG. 6(a) and FIG. 7(a), or FIG. 6(b) and FIG. 7(b).

Generally in the present invention, instantaneous alternating current flow phase shift, α, between the inner and outer active inductor segment circuits can be varied anywhere within the range from zero degrees (representing the same instantaneous current direction example above) and 180 degrees (representing the instantaneous opposite current direction example above) as graphically illustrated in FIG. 9(a). Phase shift, α, can range anywhere from zero to 180 degrees during a portion of one more induction heating cycles in the metallurgical hardening process depending upon the desired hardness pattern across the transverse width of the workpiece component.

Independent variation in the frequency, f, of the current in the inner and outer active inductor segment circuits is another parameter that can be used to control the hardness pattern across the transverse width of the workpiece component as graphically represented in FIG. 9(b).

Figure 10A:
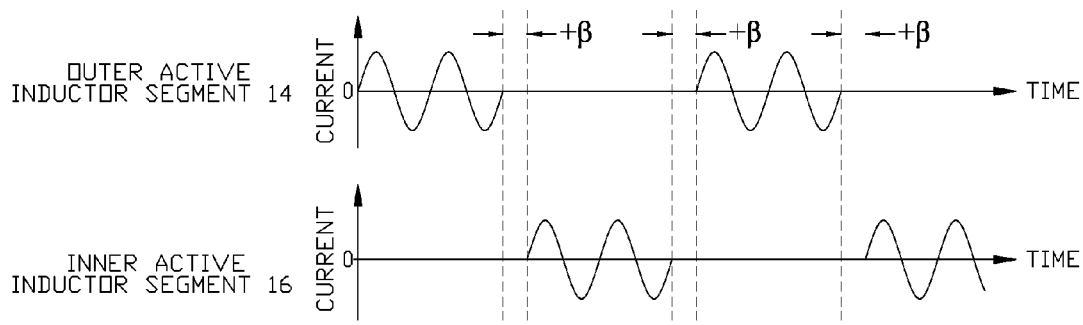
FIG. 10(a), FIG. 10(b) and FIG. 10 (c) graphically illustrate time shift control between currents in the inner and outer active inductor segments.
Figure 10B:
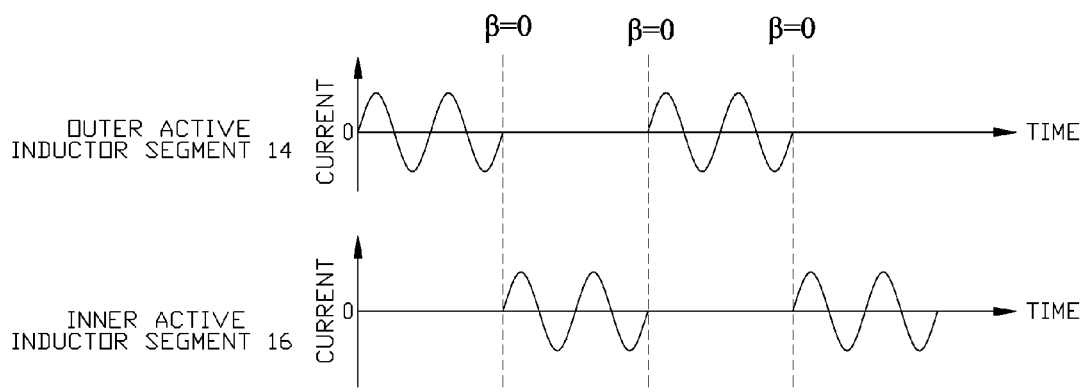
Figure 10C:
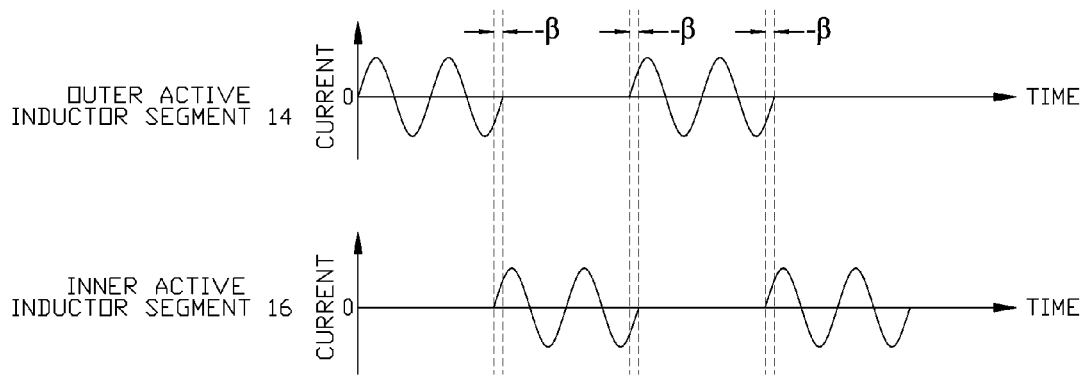

Independent time phase shifting of the current in the inner and outer active inductor segment circuits is another parameter that can be used to control the hardness pattern across the transverse width of the workpiece component. As graphically represented in FIG. 10(b) zero time phase shift, β, can be used to alternatively supply current exclusively to either the inner or outer active inductor segment circuit. Alternatively the time phase shift may be either positive as shown in FIG. 10(a), with a dead time band during which no current is supplied to either inductor segment, or negative, as shown in FIG. 10(c) with an overlap time band when current is supplied to both inductor segments.

As mentioned above, electrical current parameters, such as, current phase shift, frequency and, current time phase shift can be independently varied, either alone or in combination with each other, for the outer and inner active inductor segments, during some or all of the steps in the induction heat treatment process, to control the metallurgical hardening pattern across the transverse width, and including the fillets, of the workpiece component to be inductively heated. Additionally in some examples of the invention, the varied parameters to a pair of inner and outer coil lips may be varied so as to achieve an asymmetrical hardness pattern across the transverse width of the workpiece component, or to compensate for asymmetric features influencing the induction heat treatment process across the transverse width of the component, such as, but not limited to, adjacent irregularly shaped counterweights, geometry of a fillet, or an opening in the heat treatment region of the component.

Figure 11A:
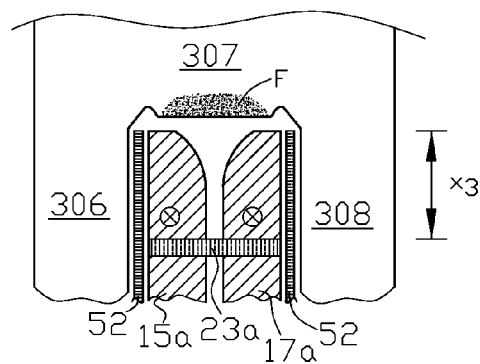
FIG. 11(a) through FIG. 11(d) illustrate in cross sectional view various applications of a cross-lips magnetic flux concentrator with the concentrator shown in cross section at line B-B in FIG. 13(a).
Figure 11B:
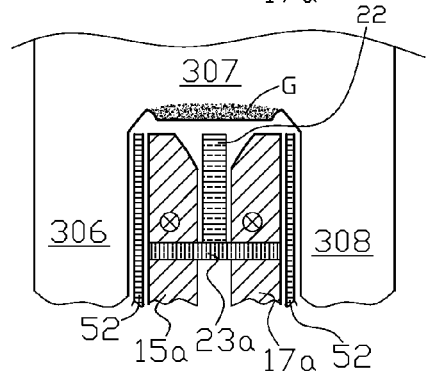
Figure 11C:
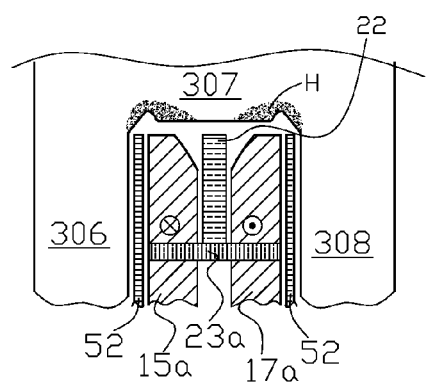
Figure 11D:
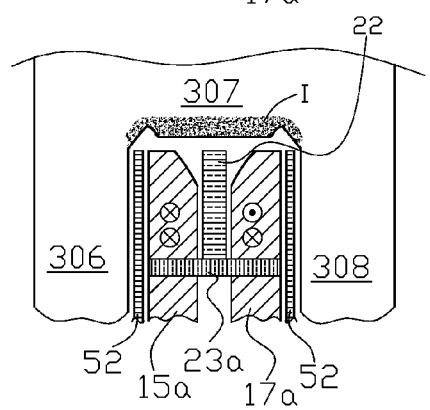
Figure 13A:
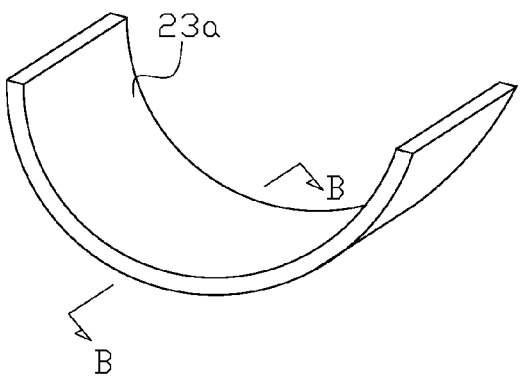
FIG. 13(a) illustrates in perspective view one non-limiting example of a cross-lips magnetic flux concentrators used in the present invention.
Figure 13B:
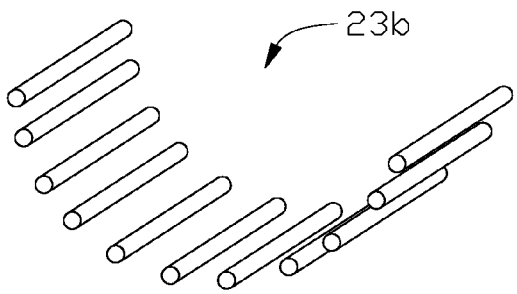
FIG. 13(b) illustrates in perspective view another example of cross-lips magnetic flux concentrators used in the present invention.
Figure 13A:
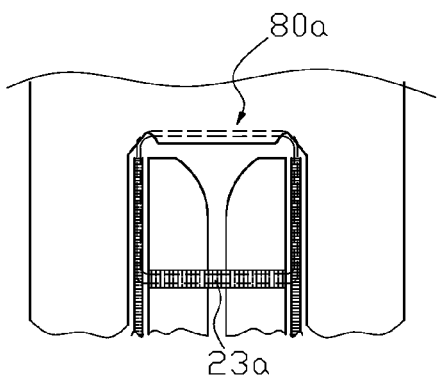
Figure 13A:
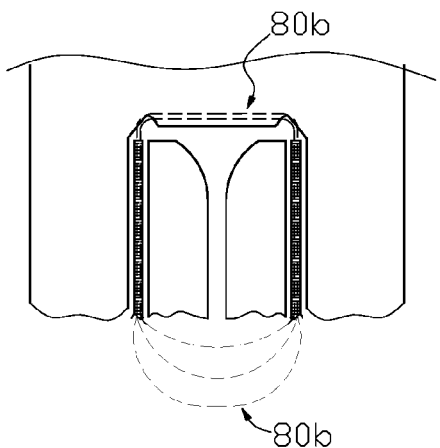
Figure 14:
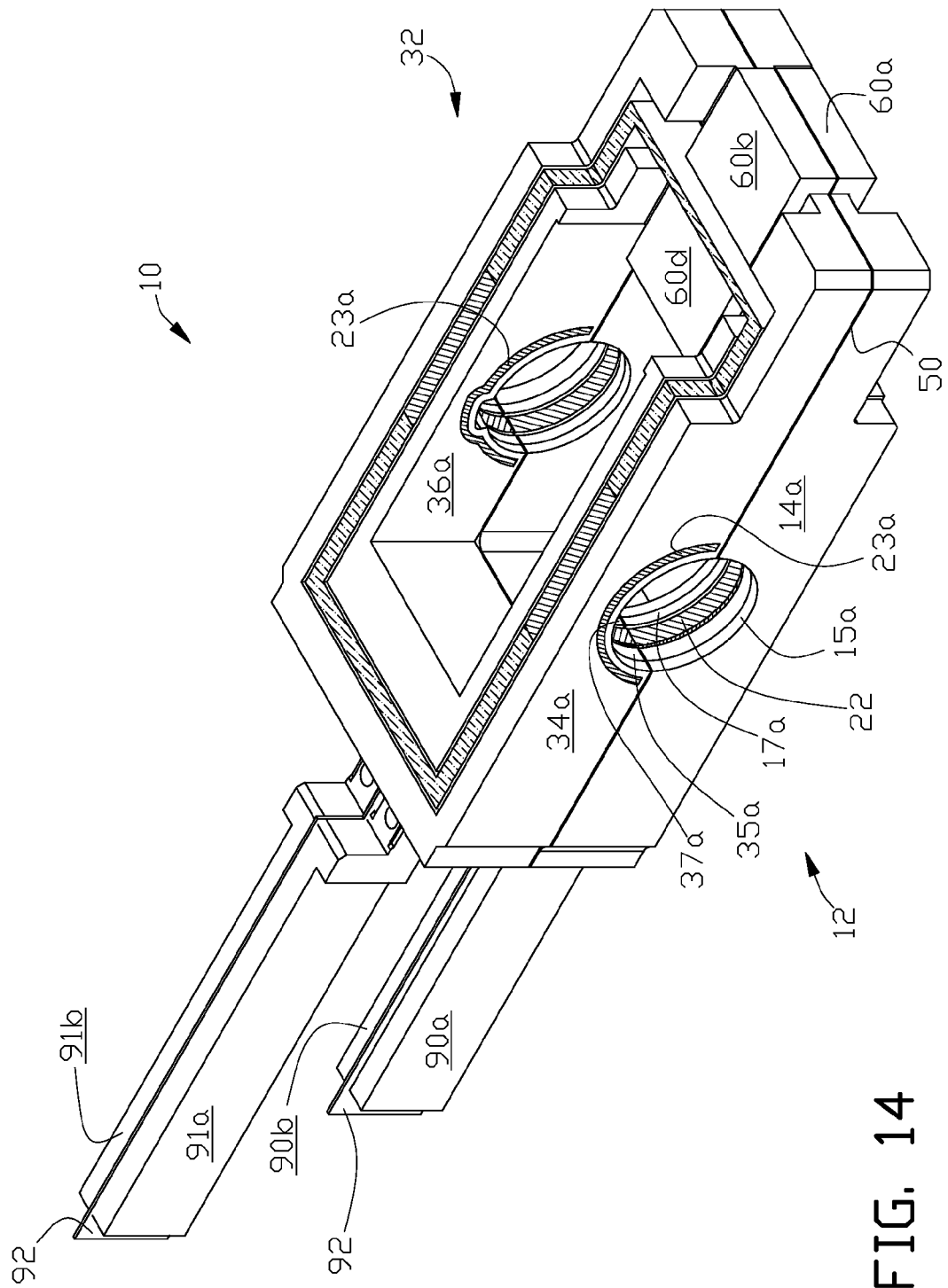
FIG. 14 is the inductor assembly shown in FIG. 4(c) with the cross-lips magnetic flux concentrators shown in FIG. 13(a) embedded around the coil lips in the passive inductor segment.
Figure 15:
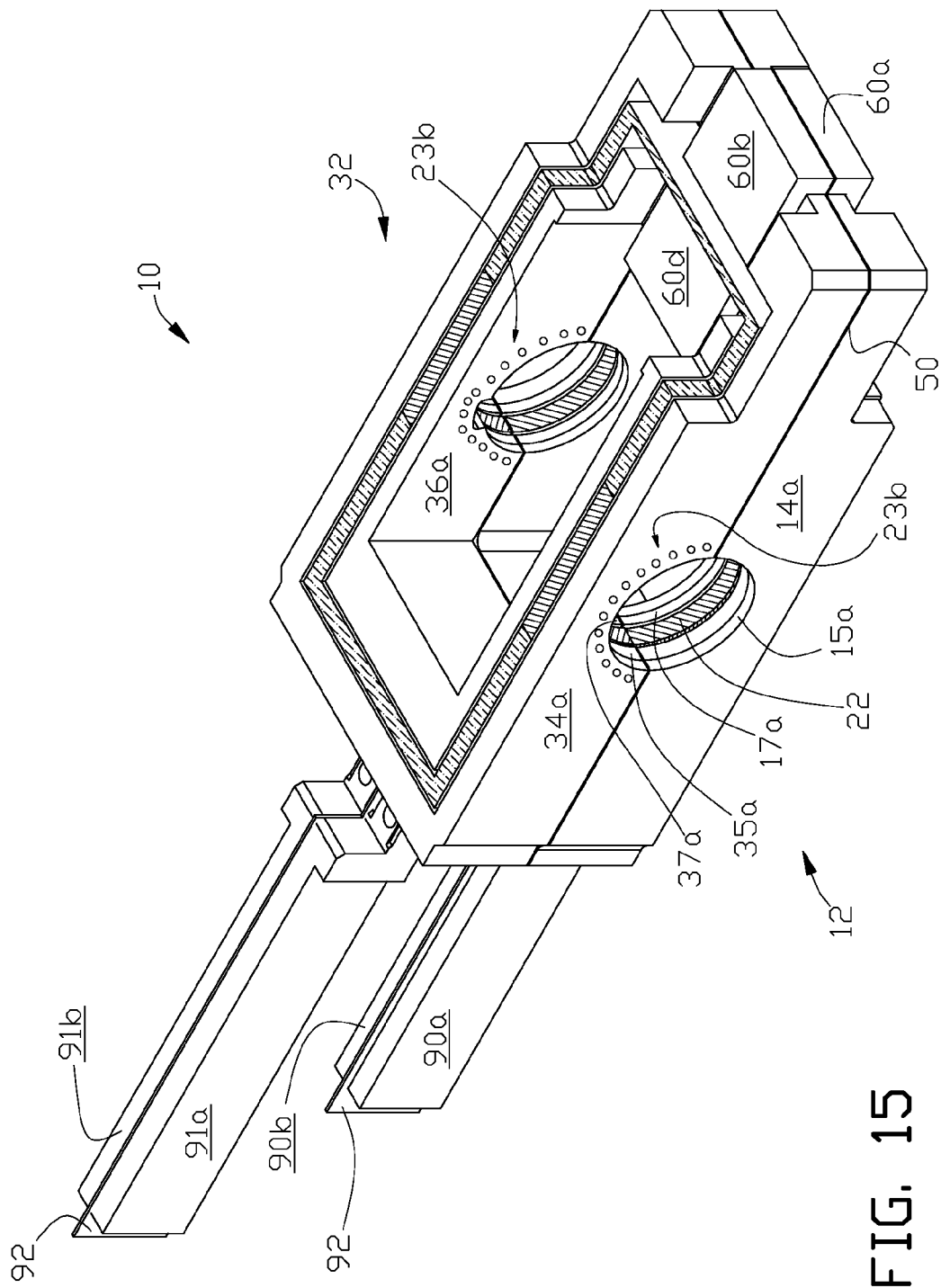
FIG. 15 is the inductor assembly shown in FIG. 4(c) with the cross-lips magnetic flux concentrators shown in FIG. 13(b) embedded around the coil lips in the passive inductor segment.

In other examples of the invention, a cross-lips magnetic flux concentrator may be utilized, either alone, or in combination with, the inter-lips flux concentrators described above. FIG. 11(a) representatively illustrates the use of cross-lips magnetic flux concentrator 23a where thumbnail hardness pattern, F, is achieved. The cross-lips magnetic flux concentrator is at least partially embedded within paired active coil lips 15a and 17a at a distance $x_3$ from the transverse tips of the paired active coils. Distance $x_3$ is selected to reduce the length of the return path of the magnetic flux produced by each lip to increase the coil electrical efficiency. The cross-lips flux concentrator 23a generally takes on an arcuate shape as illustrated in FIG. 13(a) and "closes" the external magnetic path while localizing the external magnetic field by creating a preferable low impedance magnetic flux path. This effect is illustrated by exemplary flux lines 80a and 80b (shown in dashed lines) in FIG. 13(a)' and 13(b)' with and without the cross-lips flux compensator, respectively. Doing so reduces external power losses generated within miscellaneous electrically conductive features, such as tooling or fixtures associated with an inductor assembly of the present invention. FIG. 14 illustrates slot-type cross-lips flux compensator 23a inserted around the coil lip pairs in passive coil segment 32; similar cross-lips flux compensators can be inserted around the coil lips in active coil segment 12. FIG. 13(b) illustrates another example of arcuate shaped cross-lips flux concentrator 23b wherein the flux concentrator is not a singular flux concentrator, but an arcuate array of discrete cylindrical flux concentrator elements as shown, for example, in FIG. 15 around the coil lip pairs in passive coil segment 32; similar cross-lips flux compensators can be inserted around the coil lips in active coil segment 12 to form a "squirrel cage" flux concentrator arrangement around each opening in which a workpiece component is to be heat treated. FIG. 11(b) through FIG. 11(d) illustrate examples of the present invention where a combination of cross-lips flux concentrator 23a and inter-lip flux concentrator 22 is used. Although the cross-lips flux compensator 23a shown in FIG. 11(a) through FIG. 11(d) is horizontally oriented between the pair of coil lips, more generally a cross-lips flux compensator may have other orientations and shapes as long as it extends between the pair of coil lips. Similar to the above description for inter-lips flux concentrators, the instantaneous direction of current flows indicated in FIG. 11(a) through FIG. 11(d) illustrate the variation of hardness patterns F, G, H or I, respectively, that can be achieved.

One non-limiting method of utilizing the inductor assembly of the present invention is in the apparatus disclosed in U.S. Pat. No. 6,274,857 B1. It is also within the scope of the invention to use the inductor assembly of the present invention with apparatus where the workpiece or the inductor assembly can be rotated. For example a suitable driver comprising a motor having its output shaft connected directly, or indirectly, to a rotating mounting structure can be provided for mounting of the inductor assembly or the workpiece. Alternatively both the inductor assembly and workpiece can be mounted to separate drivers so that both can be independently rotated during the heat treatment process.

Further descriptions of suitable coil lip profiling, magnetic flux concentrators and dielectric material selection can be found in U.S. Pat. Nos. 6,274,857 B1 and 6,859,125 B2.

While two substantially closed openings are formed in the inductor assembly shown in FIG. 4(c) for heat treating two components of the workpiece, in other examples of the invention, there may be only one, or more than two substantially closed openings in the inductor assembly to heat treat one, or more than two components of the workpiece.

The above examples of the invention have been provided merely for the purpose of explanation and are in no way to be construed as limiting of the present invention. While the invention has been described with reference to various embodiments, the words used herein are words of description and illustration, rather than words of limitations. Although the invention has been described herein with reference to particular means, materials and embodiments, the invention is not intended to be limited to the particulars disclosed herein; rather, the invention extends to all functionally equivalent structures, methods and uses. Those skilled in the art, having the benefit of the teachings of this specification, may effect numerous modifications thereto, and changes may be made without departing from the scope of the invention in its aspects.

The invention claimed is:

1. An inductor assembly for heating at least one substantially cylindrical component of a metal workpiece, the inductor assembly formed from an active inductor segment and a passive inductor segment, the active and passive inductor segments having means for magnetically coupling to the passive inductor segment an alternating current high frequency current supplied to the active inductor segment, at least one substantially closed opening formed partially in the active inductor segment and partially in the passive inductor segment for placement of the substantially cylindrical component for inductive heating by application of a magnetic field to the component, the magnetic field generated by the active and passive inductor segments in response to excitation by the alternating current high frequency current,
the improvement comprising,
the active inductor segment further comprising:
an outer active inductor segment formed around an outer active inductor segment through opening;
an inner active inductor segment disposed within the outer active inductor segment through opening and separated from the outer active inductor segment by an electrically isolating dielectric space;
an active inductor through opening formed within the inner active inductor segment, the active inductor through opening forming adjacent first outer and inner active coil segments and adjacent second active outer and inner active coil segments, the adjacent first outer and inner active coil segments and the adjacent second outer and inner active coil segments disposed on opposing sides of the active inductor through opening; and at least one pair of generally aligned active partial inductor segment openings formed from an opening in each one of either of the pair of the adjacent first outer and inner active coil segments or of the pair of the adjacent second outer and inner active coil segments, each of the openings in either of the pair of the adjacent first outer and inner active coil segments or the pair of the adjacent second outer and inner active coil segments having an active inductor segment arcuate coil surface interfacing respectively with an outer and inner active coil segment facing surface; and the passive inductor segment further comprising:

an outer passive inductor segment formed around an outer passive inductor segment through opening;

an inner passive inductor segment disposed within the outer passive inductor segment through opening and separated from the outer passive inductor segment by an electrically isolating dielectric space;

a passive inductor through opening formed within the inner passive inductor segment, the passive inductor through opening forming adjacent first outer and inner passive coil segments and adjacent second passive outer and inner coil segments, the adjacent first outer and inner passive coil segments and the adjacent second outer and inner passive coil segments disposed on opposing sides of the passive inductor through opening; and at least one pair of generally aligned passive partial inductor segment openings formed from an opening in each one of either of the pair of the adjacent first outer and inner passive coil segments or of the pair of the adjacent second outer and inner passive coil segments, each of the openings in either of the pair of the adjacent first outer and inner passive coil segments or the pair of the adjacent second outer and inner active coil segments having a passive inductor segment arcuate coil surface interfacing respectively with an outer and inner passive coil segment facing surface, the pairs of generally aligned active and passive partial inductor segment openings forming the at least one substantially closed opening when the outer and inner active coil segment facing surfaces face the outer and inner passive coil segment facing surfaces with the outer and inner active coil segment facing surfaces electrically isolated from the outer and inner passive coil segment facing surfaces.

2. The inductor assembly of claim 1 wherein the arcuate coil surfaces in at least one of the pairs of the adjacent first or second outer and inner active or passive inductor segments are a contoured pair of coil lips.

3. The inductor assembly of claim 2 wherein the contoured pair of coil lips are profiled to selectively compensate for the irregular mass of an irregularly-shaped component adjacent to the at least one substantially cylindrical component, an opening on the surface of the at least one substantially cylindrical component, or selective heating of a fillet region between the irregularly shaped component and the at least one substantially cylindrical component.

4. The inductor assembly of claim 2 further comprising at least one inter-lips flux concentrator disposed between the opposing sides of the contoured pair of coil lips.

5. The inductor assembly of claim 2 further comprising at least one cross-lips flux concentrator, the at least one cross-lips flux concentrator partially embedded in each of the contoured pair of coil lips at a distance offset from the tips of the contoured pair of coil lips.

6. The inductor assembly of claim 2 further comprising at least one inter-lips flux concentrator disposed between the opposing sides of the contoured pair of coil lips, and at least one cross-lips flux concentrator, the at least one cross-lips flux concentrator partially embedded in each of the contoured pair of coil lips at a distance offset from the tips of the contoured pair of coil lips.

7. The inductor assembly of claim 1 further comprising a driver to rotate the inductor assembly or the metal workpiece while the at least one substantially cylindrical component is positioned in the at least one substantially closed opening.

8. A method of inductively heating at least one substantially cylindrical component of a metal workpiece, the method comprising the steps of:

forming a substantially closed opening around the axial length of the at least one substantially cylindrical component where the substantially closed opening is formed partially in an active inductor segment and partially in a passive inductor segment, the active inductor segment comprising:

an outer active inductor segment formed around an outer active inductor segment through opening;

an inner active inductor segment disposed within the outer active inductor segment through opening and separated from the outer active inductor segment by an electrically isolating dielectric space;

an active inductor through opening formed within the inner active inductor segment, the active inductor through opening forming adjacent first outer and inner active coil segments and adjacent second active outer and inner active coil segments, the adjacent first outer and inner active coil segments and the adjacent second outer and inner active coil segments disposed on opposing sides of the active inductor through opening; and at least one pair of generally aligned active partial inductor segment openings formed from an opening in each one of either of the pair of the adjacent first outer and inner active coil segments or of the pair of the adjacent second outer and inner active coil segments, each of the openings in either of the pair of the adjacent first outer and inner active coil segments or the pair of the adjacent second outer and inner active coil segments having an active inductor segment arcuate coil surface contoured as an active coil lip interfacing respectively with an outer and inner active coil segment facing surface;

the passive inductor segment further comprising:

an outer passive inductor segment formed around an outer passive inductor segment through opening;

an inner passive inductor segment disposed within the outer passive inductor segment through opening and separated from the outer passive inductor segment by an electrically isolating dielectric space;

a passive inductor through opening formed within the inner passive inductor segment, the passive inductor through opening forming adjacent first outer and inner passive coil segments and adjacent second passive outer and inner coil segments, the adjacent first outer and inner passive coil segments and the adjacent second outer and inner passive coil segments disposed on opposing sides of the passive inductor through opening; and at least one pair of generally aligned passive partial inductor segment openings formed from an opening in each one of either of the pair of the adjacent first outer and inner passive coil segments or of the pair of the adjacent second outer and inner passive coil segments, each of the openings in either of the pair of the adjacent first outer and inner passive coil segments or the pair of the adjacent second outer and inner passive coil segments having a passive inductor segment arcuate coil surface contoured as a passive coil lip interfacing respectively with an outer and inner passive coil segment facing surface, the pairs of generally aligned active and passive partial inductor segment openings forming the at least one substantially closed opening when the outer and inner active coil segment facing surfaces face the outer and inner passive coil segment facing surfaces with the outer and inner active coil segment facing surfaces electrically isolated from the outer and inner passive coil segment facing surfaces;

supplying a first alternating current to the outer active inductor segment;

supplying a second alternating current to the inner active inductor segment;

magnetically coupling the outer active and outer passive inductor segments so that a first magnetic flux field is established at least around the coil lips formed in the outer active and passive inductor segments; and magnetically coupling the inner active and outer passive inductor segments so that a second magnetic flux field is established at least around the coil lips formed in the inner active and passive inductor segments.

9. The method of claim 8 wherein at least the phase relationship between the first and second alternating currents, or the frequency of the first or second alternating currents, or the time phasing between the first and second alternating currents is varied while inductively heating the at least one substantially cylindrical component in the substantially closed opening.

10. The method of claim 8 further comprising the step of rotating either the inductor assembly or workpiece while inductively heating the at least one substantially cylindrical component in the substantially closed opening.

11. The method of claim 8 wherein at least one inter-lips flux concentrator is positioned between the opposing sides of a pair of coil lips.

12. The method of claim 8 wherein at least one cross-lips flux concentrator is positioned between the opposing sides of a pair of coil lips.

13. The method of claim 8 wherein at least one inter-lips flux concentrator is positioned between the opposing sides of a pair of coil lips and at least one cross-lips flux concentrator is positioned between the opposing sides of a pair of coil lips.

14. An inductor for inductively heating at least one substantially cylindrical component of a metal workpiece, the inductor assembly comprising:

an active inductor segment comprising:
an outer active inductor segment formed around an outer active inductor segment through opening;
an inner active inductor segment disposed within the outer active inductor segment through opening and separated from the outer active inductor segment by an electrically isolating dielectric space;
an active inductor through opening formed within the inner active inductor segment, the active inductor through opening forming adjacent first outer and inner active coil segments and adjacent second active outer and inner active coil segments, the adjacent first outer and inner active coil segments and the adjacent second active outer and inner active coil segments disposed on opposing sides of the active inductor through opening;
at least one pair of generally aligned active partial inductor segment openings formed from an opening in each one of either of the pair of the adjacent first outer and inner active coil segments or the pair of the adjacent second outer and inner active coil segments, each of the openings in either of the pair of the adjacent first outer and inner active coil segments or of the pair of the adjacent second outer and inner active coil segments having an active inductor segment arcuate coil surface interfacing respectively with an outer and inner active coil segment facing surface; and
a means for connecting the outer active inductor segment and the inner active inductor segment to one or more sources of alternating current;

a passive inductor assembly comprising:
an outer passive inductor segment formed around an outer passive inductor segment through opening;
an inner passive inductor segment disposed within the outer passive inductor segment through opening and separated from the outer passive inductor segment by an electrically isolating dielectric space;
a passive inductor through opening formed within the inner passive inductor segment, the passive inductor through opening forming adjacent first outer and inner passive coil segments and adjacent second passive outer and inner coil segments, the adjacent first outer and inner passive coil segments and the adjacent second outer and inner passive coil segments disposed on opposing sides of the passive inductor through opening; and
at least one pair of generally aligned passive partial inductor segment openings formed from an opening in each one of either of the pair of the adjacent first outer and inner passive coil segments or the pair of the adjacent second outer and inner passive coil segments, each of the openings in either of the pair of the adjacent first outer and inner passive coil segments or the pair of the adjacent second outer and inner active coil segments having a passive inductor segment arcuate coil surface interfacing respectively with an outer and inner passive coil segment facing surface;

a means for magnetically coupling the outer active inductor segment with the outer passive inductor segment when the outer active coil segment facing surfaces face the outer passive coil segment facing surfaces with the outer active coil segment facing surface electrically isolated from the outer passive coil segment facing surface; and a means for magnetically coupling the inner active inductor segment with the inner passive inductor segment when the inner active coil segment facing surfaces face the inner passive coil segment facing surface with the inner active coil segment facing surface electrically isolated from the inner passive coil segment facing surface;

whereby the pairs of generally aligned active and passive partial inductor segment openings forming a substantially closed opening in which the at least one substantially cylindrical component is inductively heated when the outer and inner active coil segment facing surfaces respectively face the outer and inner passive coil segment facing surface with the outer and inner active coil segment facing surfaces electrically isolated from the outer and inner passive coil segment facing surfaces, and the outer and inner active inductor segments are connected to the one or more sources of alternating current.

15. The inductor assembly of claim 14 wherein the arcuate coil surfaces in at least one of the pairs of the adjacent first or second outer and inner active or passive inductor segments are a contoured pair of coil lips.

16. The inductor assembly of claim 15 wherein the contoured pair of coil lips are profiled to selectively compensate for the irregular mass of an irregularly-shaped component adjacent to the at least one substantially cylindrical component, an opening on the surface of the at least one substantially cylindrical component, or selective heating of a fillet region between the irregularly shaped component and the at least one substantially cylindrical component.

17. The inductor assembly of claim 15 further comprising at least one inter-lips flux concentrator disposed between the opposing sides of the contoured pair of coil lips.

18. The inductor assembly of claim 15 further comprising at least one cross-lips flux concentrator, the at least one cross-lips flux concentrator partially embedded in each of the contoured pair of coil lips at a distance offset from the tips of the contoured pair of coil lips.

19. The inductor assembly of claim 15 further comprising at least one inter-lips flux concentrator disposed between the opposing sides of the contoured pair of coil lips, and at least one cross-lips flux concentrator, the at least one cross-lips flux concentrator partially embedded in each of the contoured pair of coil lips at a distance offset from the tips of the contoured pair of coil lips.

20. The inductor assembly of claim 14 further comprising a driver to rotate the inductor assembly or the metal workpiece while the at least one substantially cylindrical component is positioned in the at least one substantially closed opening.

* * * * *